(12) United States Patent
Grip et al.

(10) Patent No.: US 11,919,706 B2
(45) Date of Patent: Mar. 5, 2024

(54) APPARATUS FOR ENGAGING AND SECURING CONTAINER CORNER FITTINGS

(71) Applicant: THE BOEING COMPANY, Chicago, IL (US)

(72) Inventors: Robert Erik Grip, Rancho Palos Verdes, CA (US); Eric Andrews, Redondo Beach, CA (US)

(73) Assignee: THE BOEING COMPANY, Arlington, VA (US)

( * ) Notice: Subject to any disclaimer, the term of this patent is extended or adjusted under 35 U.S.C. 154(b) by 939 days.

(21) Appl. No.: 16/720,371

(22) Filed: Dec. 19, 2019

(65) Prior Publication Data

US 2021/0188536 A1 Jun. 24, 2021

(51) Int. Cl.
*B65D 90/00* (2006.01)
*B60P 7/13* (2006.01)
*B65D 88/02* (2006.01)

(52) U.S. Cl.
CPC ............ *B65D 90/0006* (2013.01); *B60P 7/13* (2013.01); *B65D 88/022* (2013.01); *B65D 90/0026* (2013.01)

(58) Field of Classification Search
CPC .............. B65D 90/0006; B65D 88/022; B65D 90/0026; B60P 7/13
See application file for complete search history.

(56) References Cited

U.S. PATENT DOCUMENTS

| | | | |
|---|---|---|---|
| 3,563,403 A | 2/1971 | Luisada et al. | |
| 3,598,273 A | 8/1971 | Rau et al. | |
| 3,601,866 A | 8/1971 | Odin | |
| 3,706,392 A | 12/1972 | Sprick et al. | |
| 3,711,902 A | 1/1973 | Eggert, Jr. | |
| 3,718,218 A * | 2/1973 | Shields | B65D 90/0006 414/803 |
| 3,966,075 A | 6/1976 | Schultz | |
| 4,249,840 A | 2/1981 | Kallaes et al. | |
| 4,695,184 A | 9/1987 | Robishaw et al. | |
| 4,759,668 A | 7/1988 | Larsen et al. | |
| 4,768,905 A * | 9/1988 | Reynard | B65D 90/0006 24/287 |

(Continued)

FOREIGN PATENT DOCUMENTS

| | | |
|---|---|---|
| AT | 510497 A1 | 4/2012 |
| CN | 1671933 A | 9/2005 |

(Continued)

OTHER PUBLICATIONS

European Patent Office Extended European Search Report for Application No. 20211436.9-1016 dated Nov. 5, 2021.

(Continued)

*Primary Examiner* — Daniel J Wiley

(74) *Attorney, Agent, or Firm* — Patterson + Sheridan, LLP

(57) ABSTRACT

Certain aspects of the present disclosure provide techniques for manipulating and securing containers. In one example, a method includes attaching a tool to a first corner fitting of a first container and a second corner fitting of a second container; applying a torque to the rotatable pinion in order to cause the first corner fitting to engage the second corner fitting; and removing the tool from the first corner fitting and the second corner fitting.

20 Claims, 23 Drawing Sheets

(56) References Cited

U.S. PATENT DOCUMENTS

| | | |
|---|---|---|
| 5,026,230 A | 6/1991 | Dolezych et al. |
| 6,010,021 A | 1/2000 | Zuidam et al. |
| 6,299,008 B1 | 10/2001 | Payne |
| 10,308,424 B2 | 6/2019 | Vancampen |
| 10,947,036 B2 | 3/2021 | Helou, Jr. |
| 2003/0215300 A1 | 11/2003 | Hsieh |
| 2007/0000921 A1 | 1/2007 | Butler et al. |
| 2017/0283114 A1 | 10/2017 | Marschall |
| 2018/0178709 A1* | 6/2018 | Kismarton ............. B62D 33/02 |
| 2018/0194548 A1 | 7/2018 | Helou, Jr. |
| 2021/0188537 A1* | 6/2021 | Grip ......................... B60P 7/10 |

FOREIGN PATENT DOCUMENTS

| | | |
|---|---|---|
| CN | 1955087 A | 5/2007 |
| CN | 201395359 Y | 2/2010 |
| CN | 102639411 A | 8/2012 |
| CN | 108082754 A | 5/2018 |
| CN | 207791668 U | 8/2018 |
| FR | 2732313 A1 | 10/1996 |
| GB | 406935 A | 3/1934 |
| GB | 2485333 A | 5/2012 |
| WO | 2010106367 A2 | 9/2010 |

OTHER PUBLICATIONS

European Patent Office, Communication pursuant to Article 94(3) EPC for Application 20 211 436.9-1014 dated Feb. 27, 2023.
Chinese National Intellectual Property Administration, First Notification of Office Action for Application 202011153386.1 dated Aug. 9, 2023.

* cited by examiner

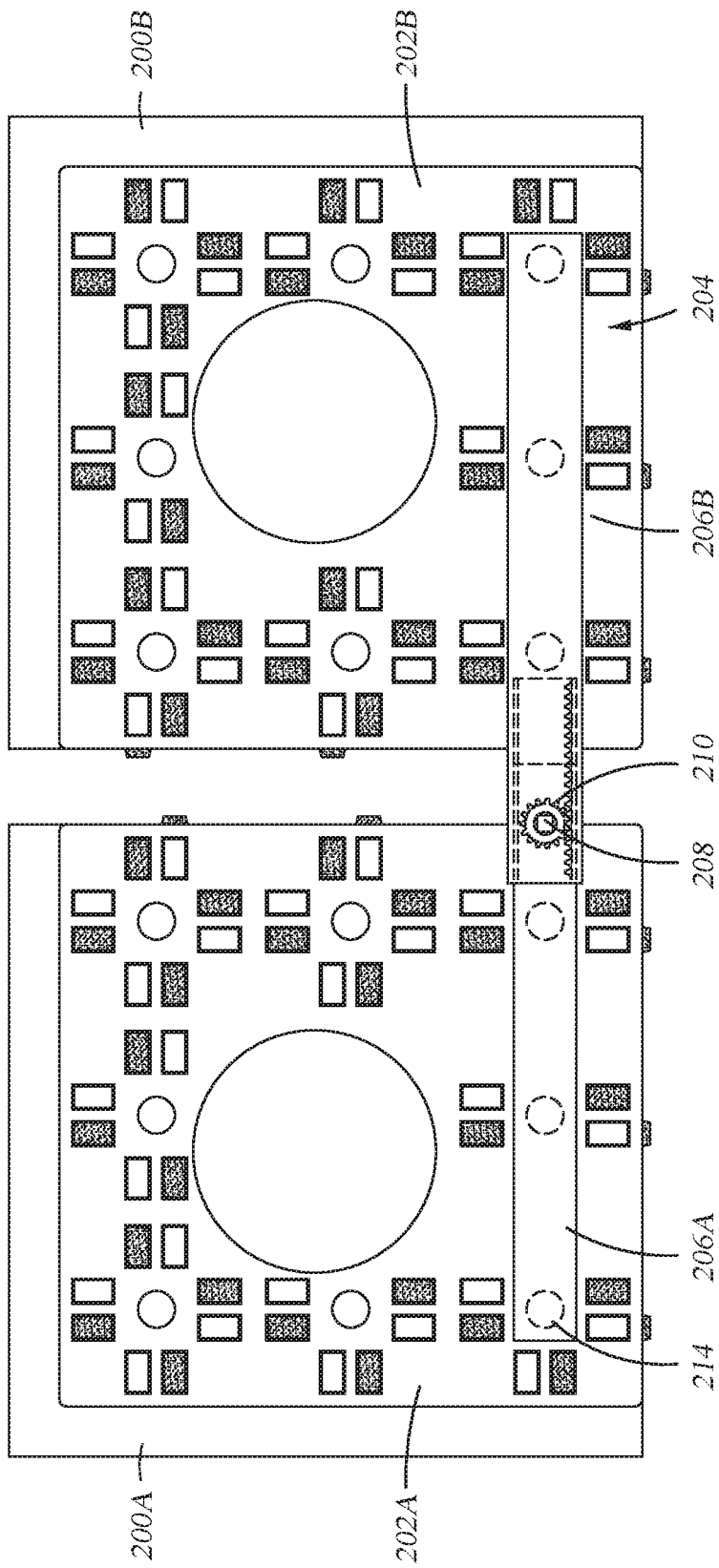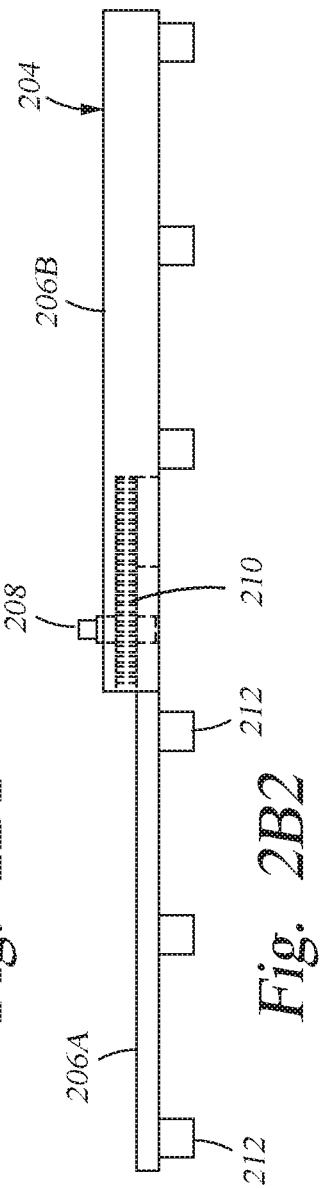
Fig. 2B1
Fig. 2B2

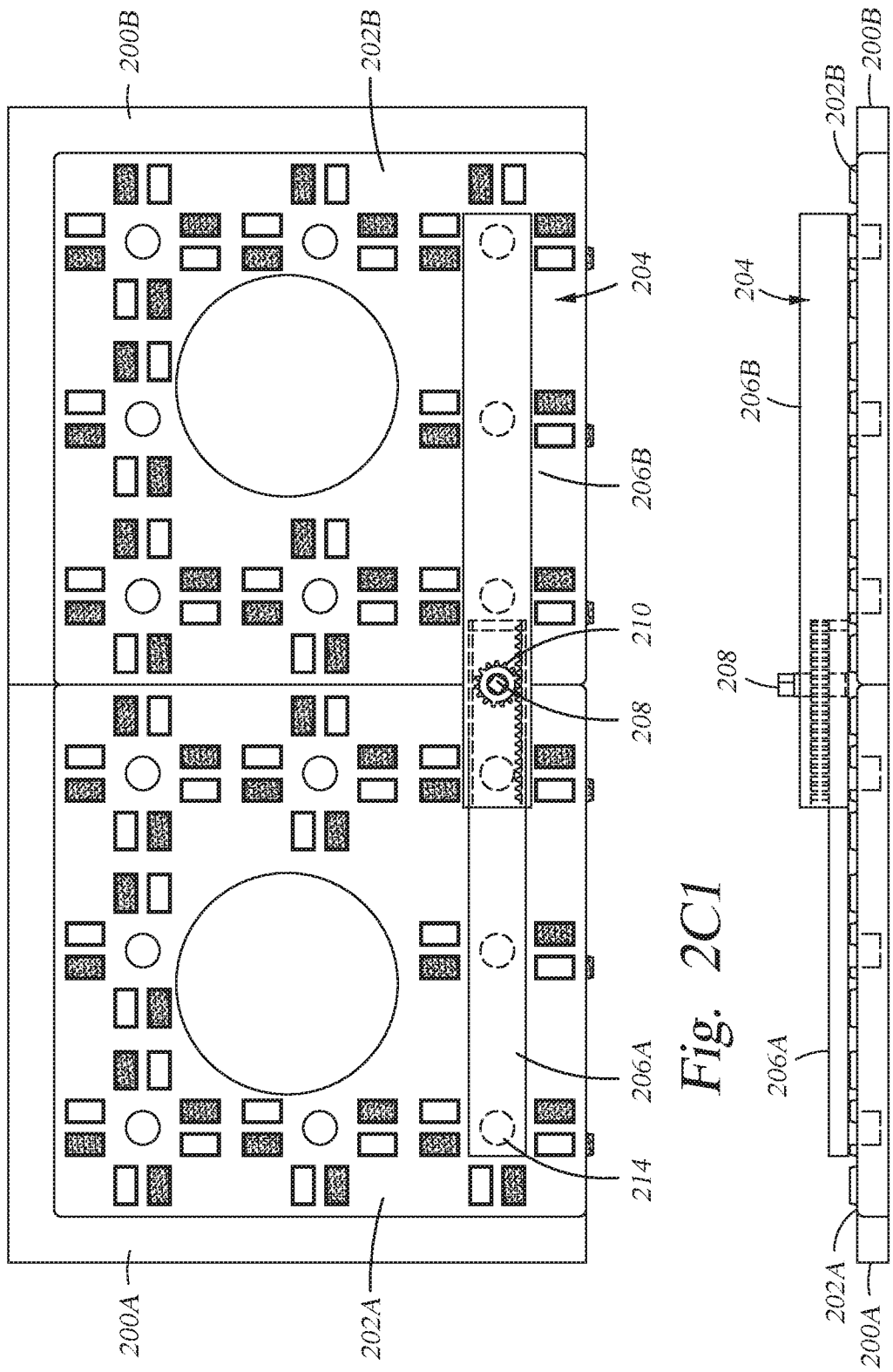

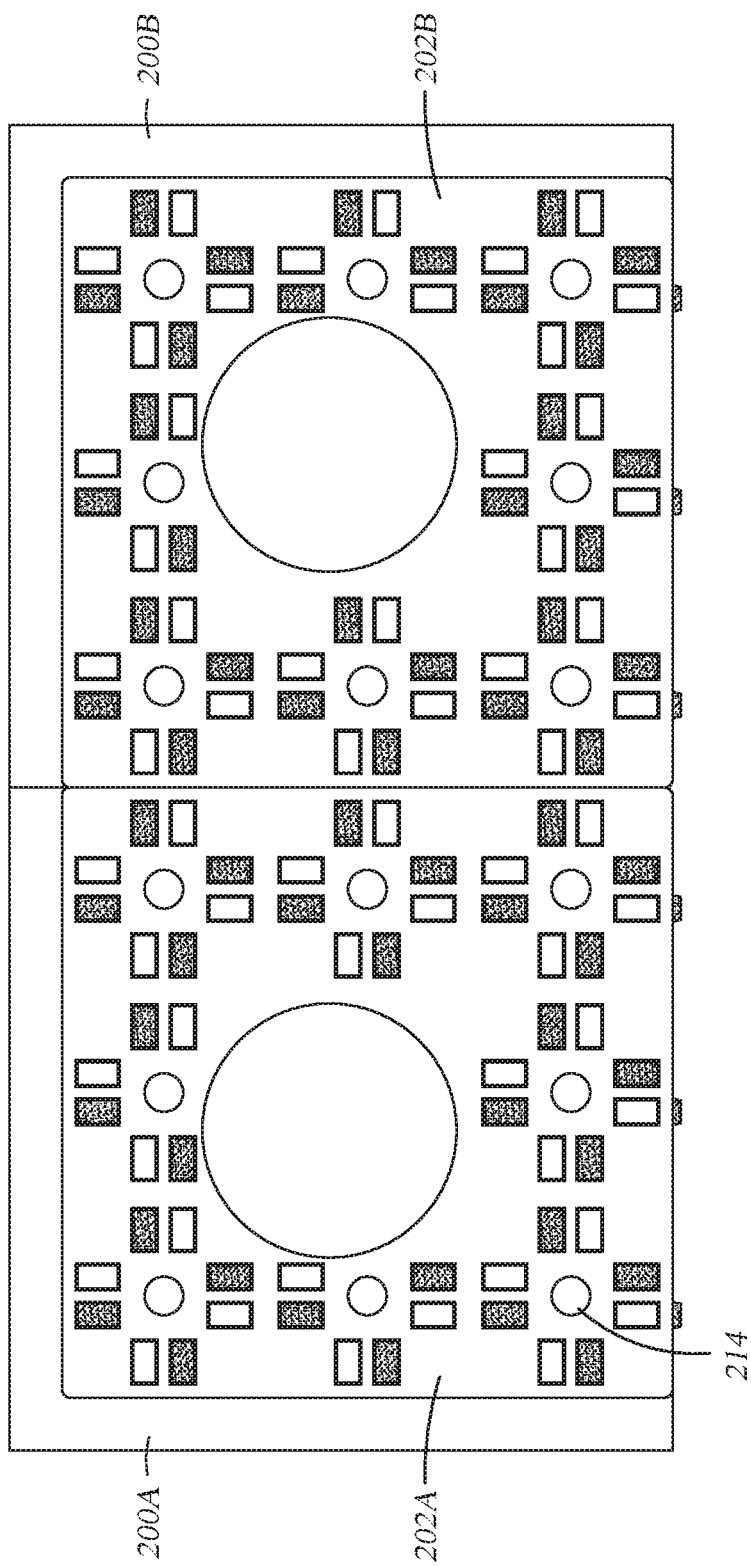
Fig. 2D1
Fig. 2D2

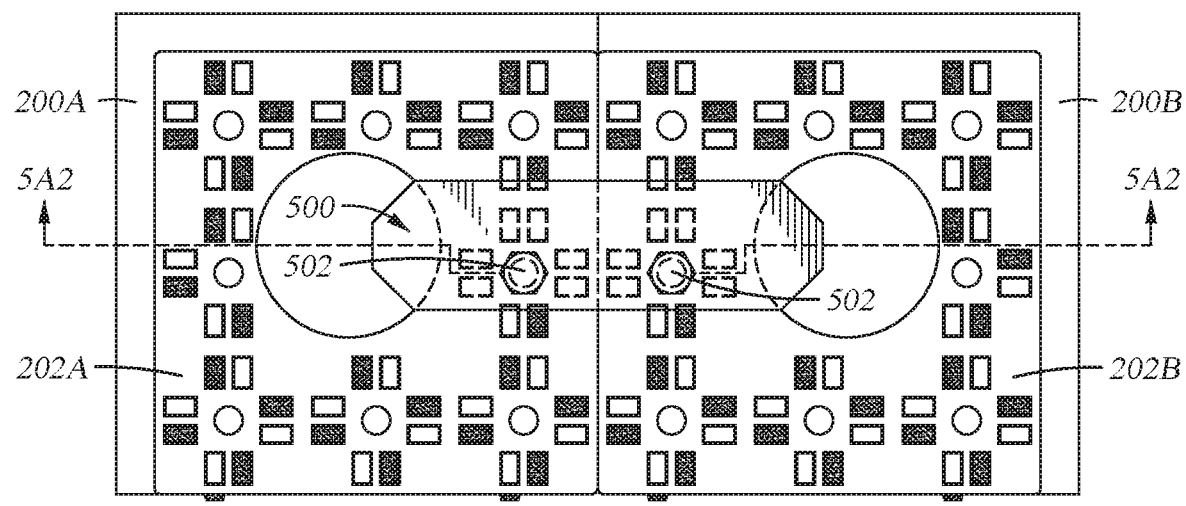
Fig. 5A1
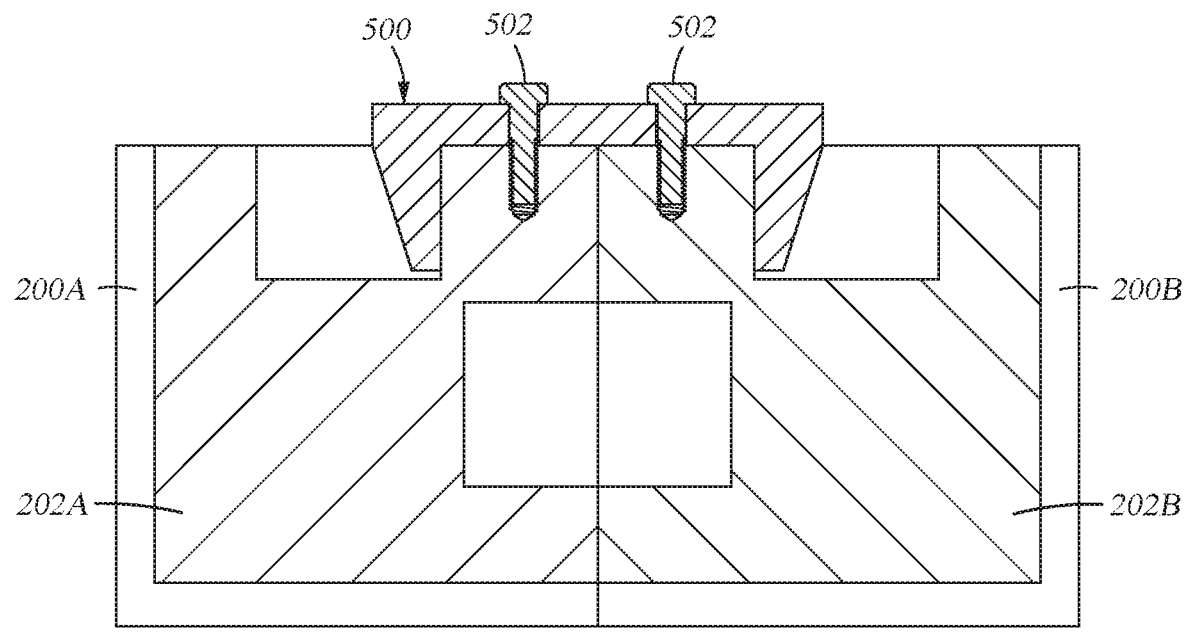
Fig. 5A2

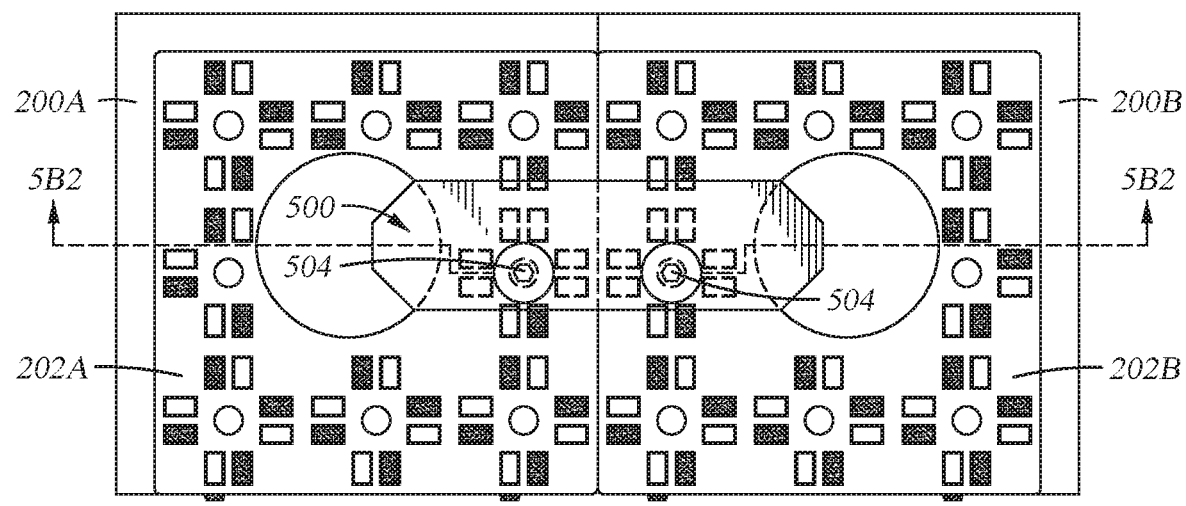
Fig. 5B1
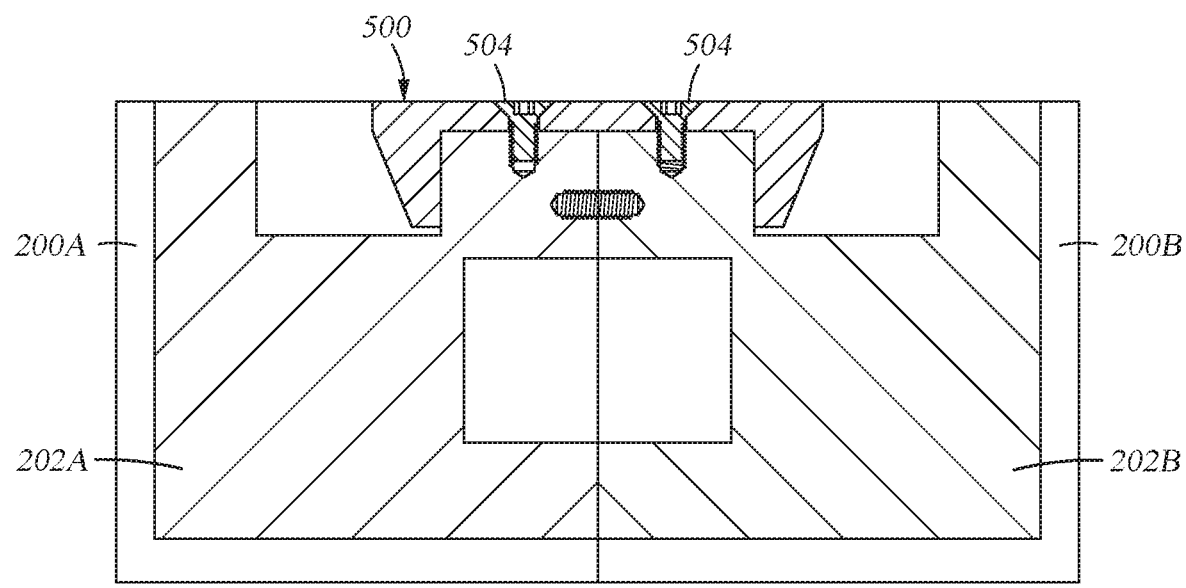
Fig. 5B2

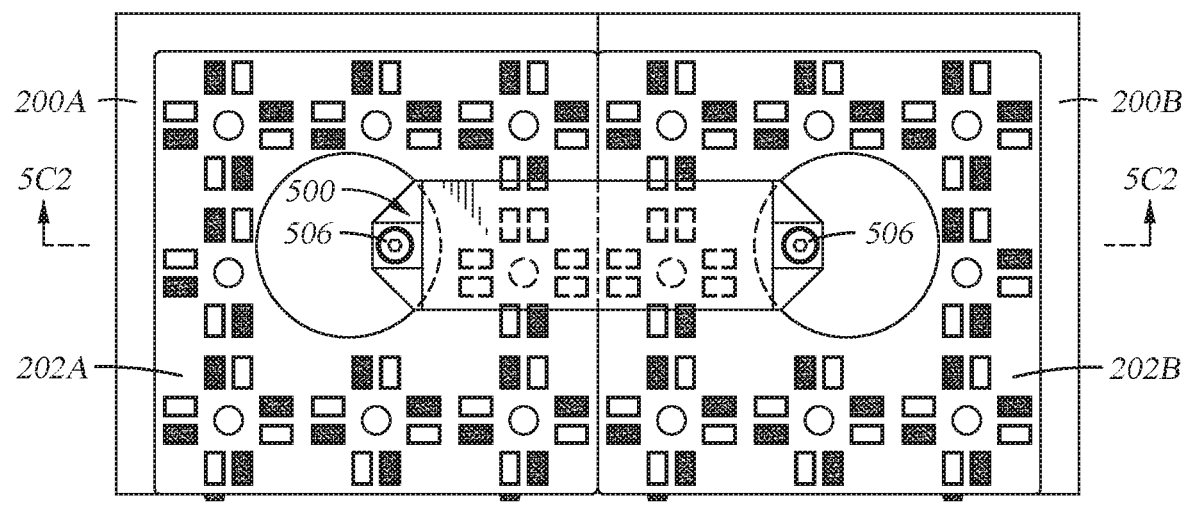
Fig. 5C1
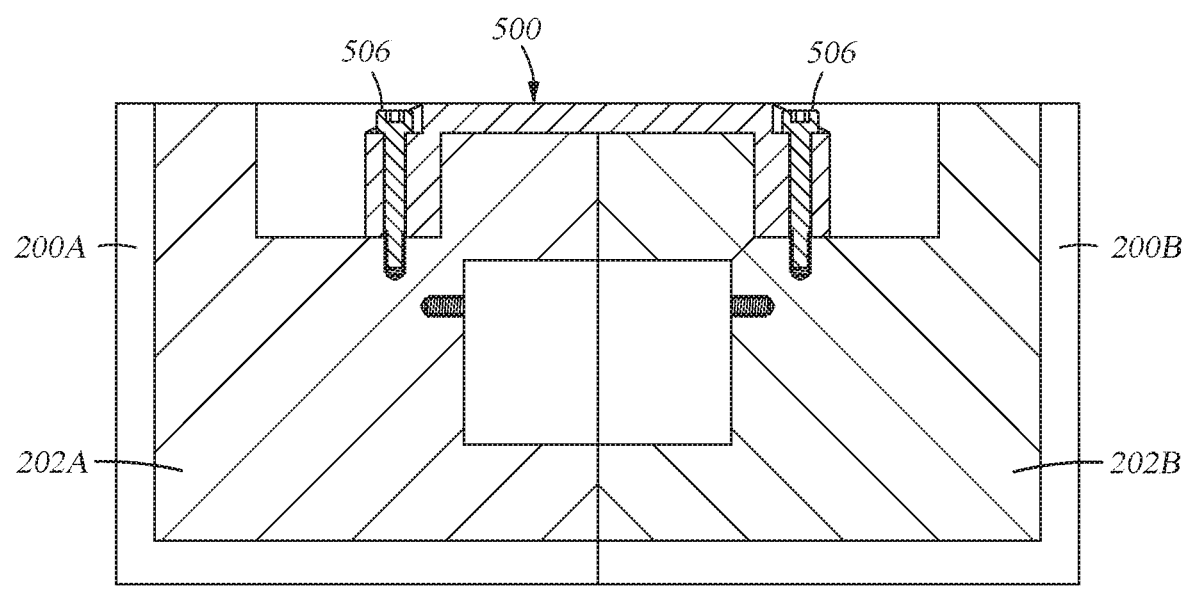
Fig. 5C2

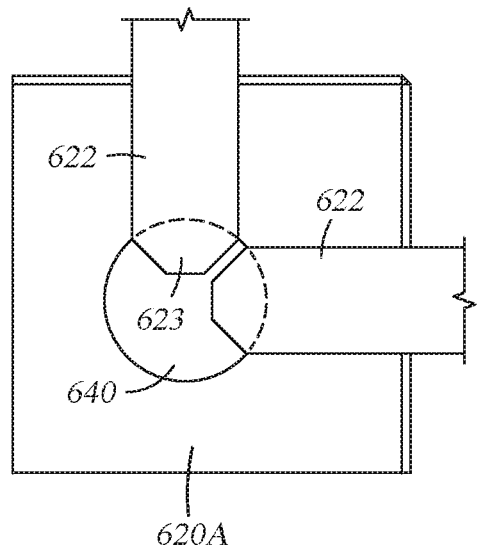
Fig. 6C1
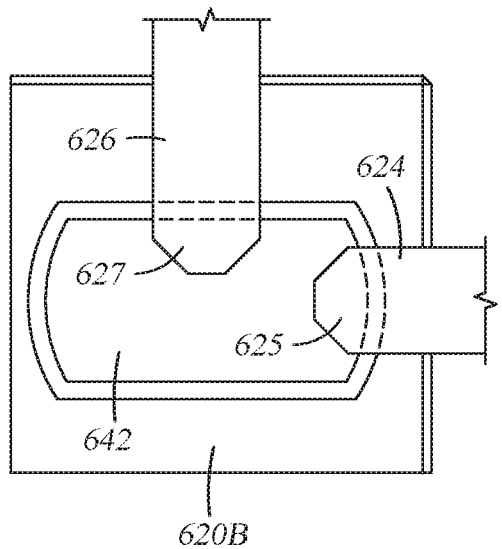
Fig. 6C2
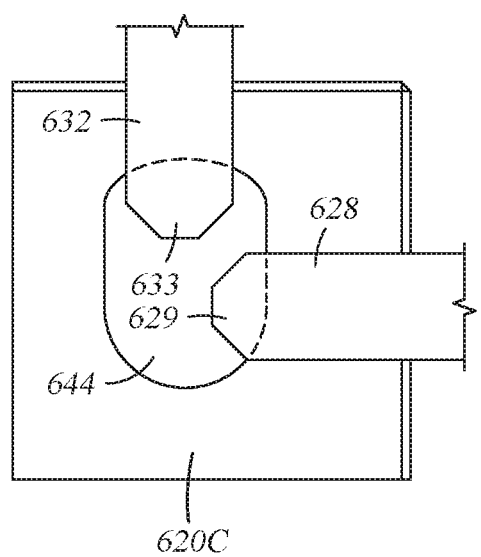
Fig. 6C3
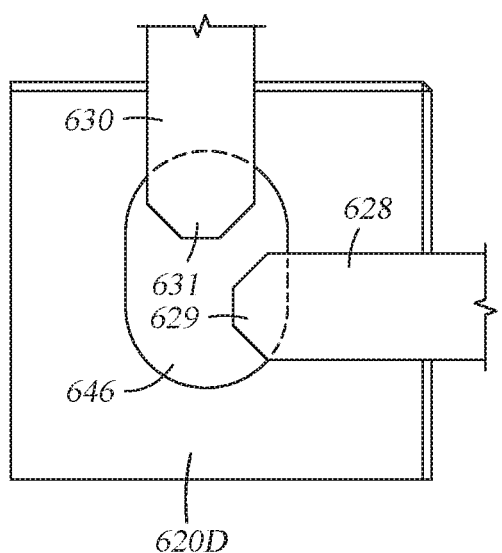
Fig. 6C4

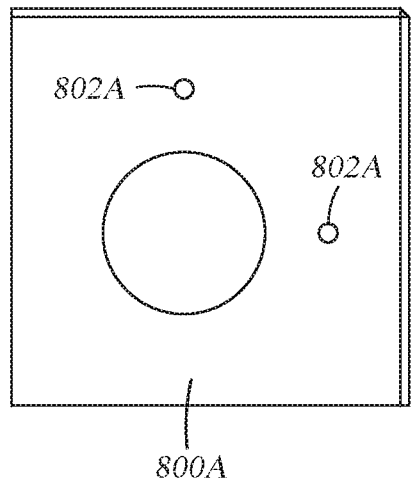
*Fig. 8A1*
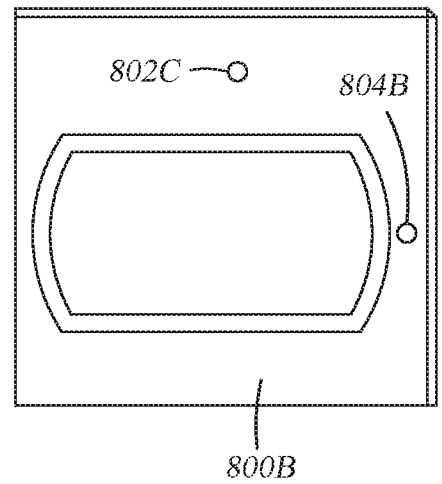
*Fig. 8A2*
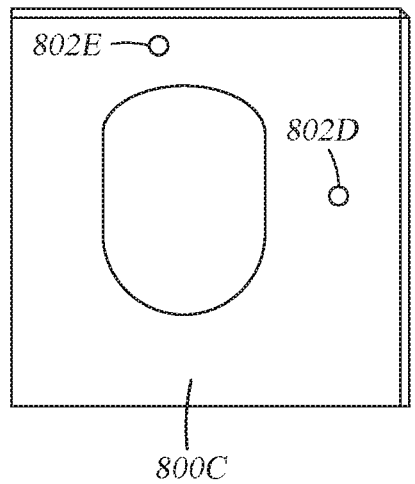
*Fig. 8A3*
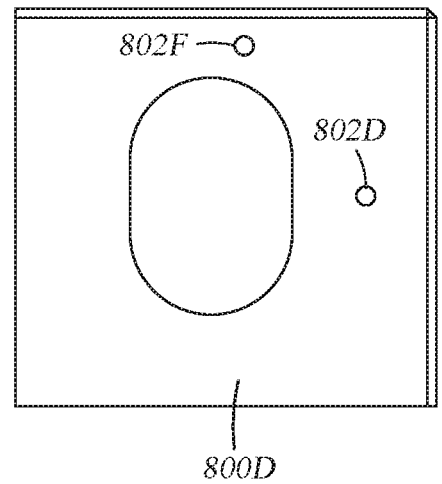
*Fig. 8A4*

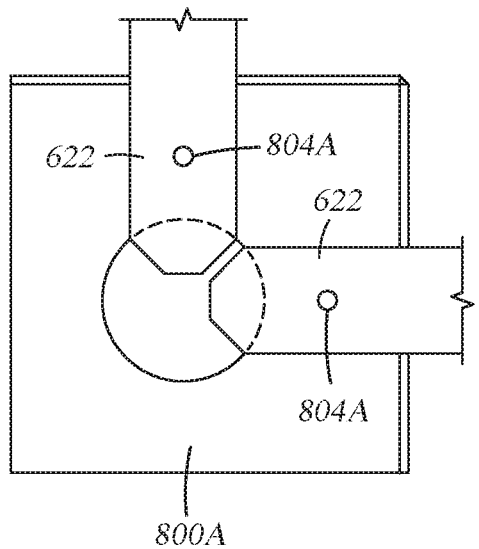
Fig. 8B1
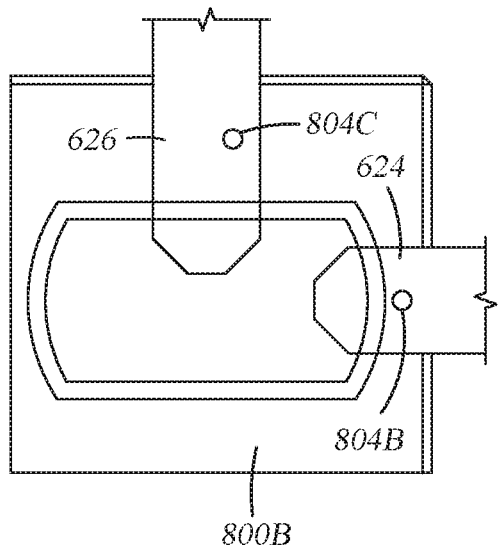
Fig. 8B2
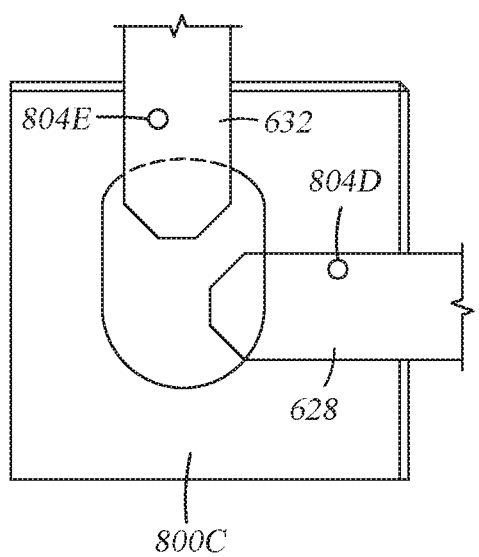
Fig. 8B3
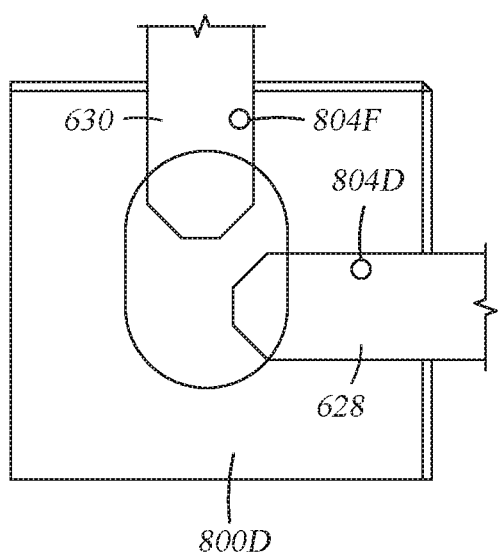
Fig. 8B4

APPARATUS FOR ENGAGING AND SECURING CONTAINER CORNER FITTINGS

INTRODUCTION

Aspects of the present disclosure relate to cargo container connection equipment, and in particular to apparatuses and methods for engaging and securing corner fittings found on cargo containers.

Cargo containers are moved about the world by various types of crafts, such as trucks, ships, trains, and aircraft. In order to facilitate shipment of goods in a global economy, standards for shipping containers have been developed to enable intermodal shipping. So-called "ISO" containers are containers with standardized outer dimensions as well as standardized connection point locations and hardware so that containers may reliably be carried from place to place by various types of crafts with complementary container connection equipment.

While standards have emerged for cargo containers, the connection equipment used for such cargo containers has generally gone without development. Conventional connection equipment is designed to stay affixed to a cargo container and whatever it is connected to, such as another container or a carrier vehicle. Conventional equipment therefore increases the container's tare weight at the expense of its net weight carrying capacity. Further, conventional connection equipment only works when containers are oriented precisely with respect connection equipment, which may require difficult and time-consuming manual manipulation of containers before shipment.

Accordingly, there is a need for improved apparatuses and methods for engaging and securing cargo containers.

BRIEF SUMMARY

Certain embodiments provide a method of securing containers, comprising: attaching a tool to a first corner fitting of a first container and a second corner fitting of a second container, wherein: the tool comprises: a first slideable portion comprising a first plurality of pins and a rack; and a second slideable portion slideably connected to the first slideable portion and comprising a second plurality of pins and a rotatable pinion in contact with the rack, and attaching the tool comprises: inserting the first plurality of pins on the first slidable portion into a first plurality of engagement recesses in the first corner fitting; and inserting the second plurality of pins on the second slideable portion into a second plurality of engagement recesses in the second corner fitting; applying a torque to the rotatable pinion in order to cause: the first slideable portion to apply a first force to the first corner fitting in a first direction and move the first container in the first direction; and the second slideable portion to apply a second force to the second container in a second direction, opposite the first direction, and move the second container in the second direction; and removing the tool from the first corner fitting and the second corner fitting after the first corner fitting is moved into engagement with the second corner fitting.

Further embodiments provide a method of securing containers, comprising: determining a first aperture geometry of an aperture of a first corner fitting; determining a second aperture geometry of an aperture of a second corner fitting; selecting a corner fitting clip based on the first aperture geometry and the second aperture geometry; and affixing the corner fitting clip to the aperture of the first corner fitting and the aperture of the second corner fitting.

Further embodiments provide a tool for manipulating containers, comprising: a first slideable portion comprising a first plurality of pins and a rack; and a second slideable portion slideably connected to the first slideable portion and comprising a second plurality of pins and a rotatable pinion in contact with the rack, wherein the first plurality of pins and the second plurality of pins are configured to engage with engagement recesses of a corner fitting.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIGS. 2A-2D2 depict an example of using improved tools for engaging and manipulating containers including corner fittings.

FIGS. 5A1-5C2 depict various embodiments of additional hardware for retaining corner fitting clips.

FIGS. 6A-6C4 depict various geometries for the container corner fitting clips.

FIGS. 8A1-8B4 depict examples of clip and corner fitting features for further retaining clips.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1A:
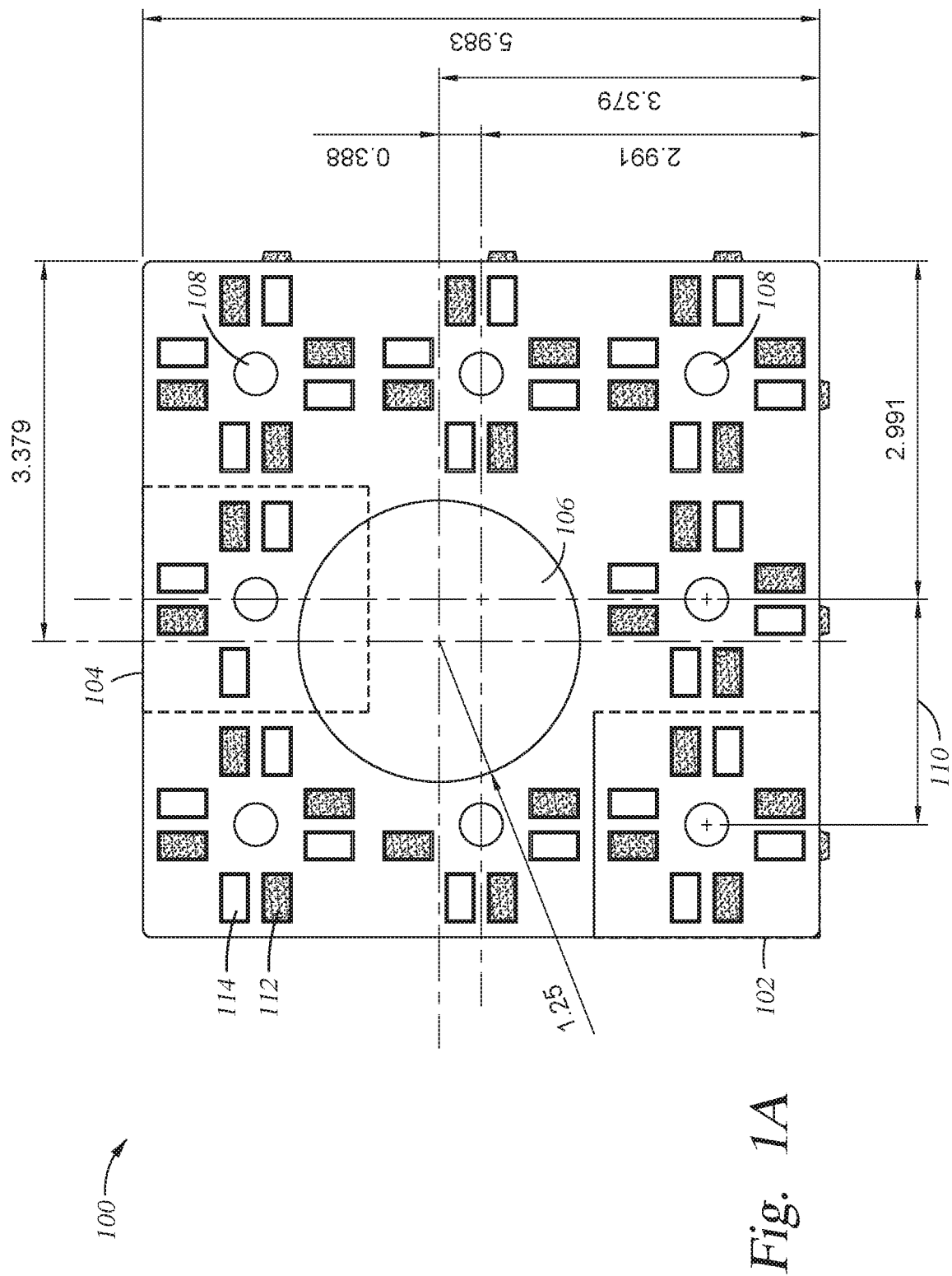
FIGS. 1A and 1B depict examples of corner fittings with surface connector arrangements.

Aspects of the present disclosure provide apparatuses and methods for engaging and securing corner fittings found on cargo containers.

Cargo carrying crafts, such as trucks, ships, trains, and aircraft move a great amount of cargo around the world. In order to do so efficiently, standardized container sizes and fittings have emerged to allow for efficient intermodal shipping.

Conventional equipment for connecting containers to container as well as containers to carriers (e.g., a truck, ship, train, or aircraft) has also been developed. For example, various types of ISO-compatible "twist-locks" are available for connecting containers with ISO-standard fittings (e.g., corner fittings). However, such conventional connection equipment is not intended to be used with containers that are arranged wall-to-wall with no significant gap between the containers. Rather, ISO-compatible connection equipment tends to be based on multiple inch gaps (e.g., 3" in the horizontal direction and 1" in the vertical direction) between containers when arranged for connection. Further, conventional equipment tends to be heavy, expensive, and finicky to use. For example, a conventional twist-lock requires precise alignment of the fitting with the twist lock for proper engagement. When such connection equipment is being used with large containers, such as ISO-standard 20-foot and 40-foot shipping containers, moving the container into a particular alignment is difficult because of the significant weight of such containers. The heavy weight of such containers results in very heavy weight for conventional connection equipment, such as ISO-compatible twist-locks. And because conventional connection equipment is configured to stay attached to the container, it increases the tare weight of the container to the detriment of the container's net weight carrying capacity. Further, in some cases, conventional connection equipment includes additional material to assist in aligning connections, but because this material travels with the connection equipment, it exacerbates the weight problem.

To overcome the limitations of conventional connection equipment, embodiments described herein separate the tasks of engaging and securing corner fittings. In other words, instead of having one mechanism to both engage the corner fittings and also secure them, such as a conventional twist-lock, embodiments described herein include separate aspects for engaging and securing container corner fittings that include surface connector arrangements.

Container Corner Fittings with Surface Connector Arrangements

Containers corner fitting described herein may utilize surface connector arrangements, which allow for direct interface between corner fittings of adjacent containers.

Surface connector arrangements on corner fittings, and on other container surfaces, may include patterns of connector elements. Patterns of connector elements may comprise multiple types of interlocking connector elements. For example, a first type of connector element (e.g., a "male" connector element) may comprise a protrusion, projection, pad or the like configured to fit within a recess of a second type of connector element (e.g., a "female" connector element). Connector elements may be formed in many shapes.

Corner fittings are different from corner-mounted surface connectors in that corner fittings are generally independent three-dimensional structures having their own interior volume that may be joined with, attached to, or made integral with a modular container, while corner-mounted surface connectors are generally joined with, attached to, or made integral with a surface of a modular container, but do not include their own interior volume.

In the examples depicted herein, corner fittings are depicted generally in a plan view with one face showing, but note that corner fittings are generally three dimensional, and may have multiple faces, such as six faces for rectangular cuboid shapes. The faces of a corner fitting are generally joined by edges. Because corner fittings may be designed to be permanently affixed to a container, such as welded to a container, some surfaces and edges may include surface connector elements and some may not. For example, internal faces (i.e., those pointing inward toward the container and not outward), may not include surface connector elements because they would not be able to engage (or interface) with other surface connector elements on other containers. Thus, as depicted in the following examples of corner fittings, certain edges that do not show protruding surface connector elements may be located on the inward-facing faces of the corner fittings.

Some arrangements of connector elements may be considered "passive" or "one-way" in that all of the connector elements are of a single type. For example, an arrangement may include all female type recesses. Such an arrangements may be intended to have other surface connectors attached to it.

Some arrangements of connector elements may be considered "active" or "two-way" in that its connector elements are of multiple types, such as a first type (e.g., protrusions) and a second type (e.g., recesses).

Some arrangements of connector elements may include fewer connector elements of the first type (protrusions) than of the second type (recesses). Other arrangements of connector elements could have more connector elements of the first type (protrusions) than the second type (recesses). However, in order to make sure that the arrangements could always interface correctly (e.g., where a protrusion has no matching recess with which to interface), the protrusions may be made spring-loaded.

Figure 1B:
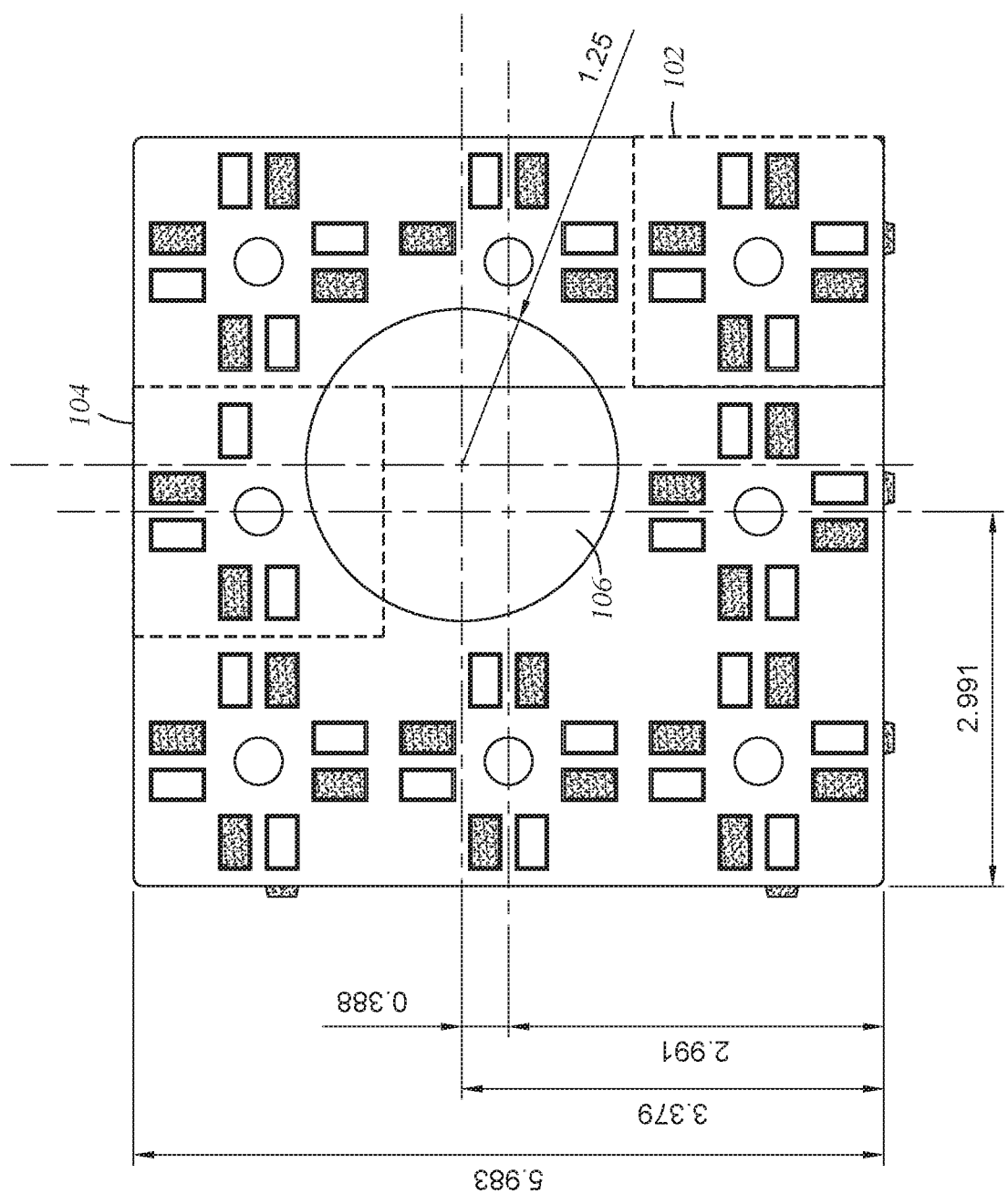

FIGS. 1A and 1B depict examples of a nominal 6-inch corner fitting with nominal 2-inch surface connector arrangements.

FIG. 1A depicts a left-side corner fitting 100, which includes 2-inch nominal (1.993 inch actual) surface connector arrangements 102. In this embodiment, the surface connector arrangements are rotationally symmetric about the center of each full arrangement, which means each surface connector arrangement 102 presents the same pattern of connector elements when rotated by any 90 degree increment. For example, each surface connector arrangement can be divided into eight 45-degree wide zones starting from a vertical line (not depicted) emanating from the center of the arrangement to a top edge of the arrangement. Notably, some arrangements, such as 104, are incomplete due to the aperture 106.

Each of the surface connector arrangements 102 includes a pattern of connector elements of a first type and a second type, such as protrusions 112 and recesses 114. Notably, some of the surface connector arrangements (e.g., 104) have incomplete patterns of surface connectors due to the aperture 106.

In this embodiment, the center of aperture 106 is offset 3.379 inches from two sides (or edges) of corner fitting 100 to enable compatibility with existing ISO corner fitting hole-to-corner fitting hole dimensions. Specifically, in this example, the center of aperture 106 is 3.379 inches from a first side (or edge) located along the right side of corner fitting 100, and a second side (or edge) located along the bottom side of corner fitting 100. Further, in this embodiment, aperture 106 is 2.5 inches in diameter.

In this embodiment, the surface connector arrangements each have centered engagement recesses 108 (or apertures) that allow for interfacing with ancillary equipment, such as the engagement and manipulation equipment described below with respect to FIGS. 2A-3B. In this embodiment, each engagement recess 108 has a 0.375-inch diameter and is arranged in a grid pattern, spaced from adjacent recesses by a 1.993-inch spacing (e.g., 110). Note, however, that in other embodiments, the engagement recesses 108 may be different diameters and arranged in different patterns.

Further in this embodiment, left side corner fitting 100 has a first exterior dimension of 5.983 inches in height and second exterior dimension of 5.983 inches in width. In some embodiments, left side corner fitting 100 also has a third exterior dimension of 5.983 inches in depth.

FIG. 1B depicts a right-side corner fitting 150, which is a mirror of the left-side corner fitting in FIG. 1A.

Figure 2A:
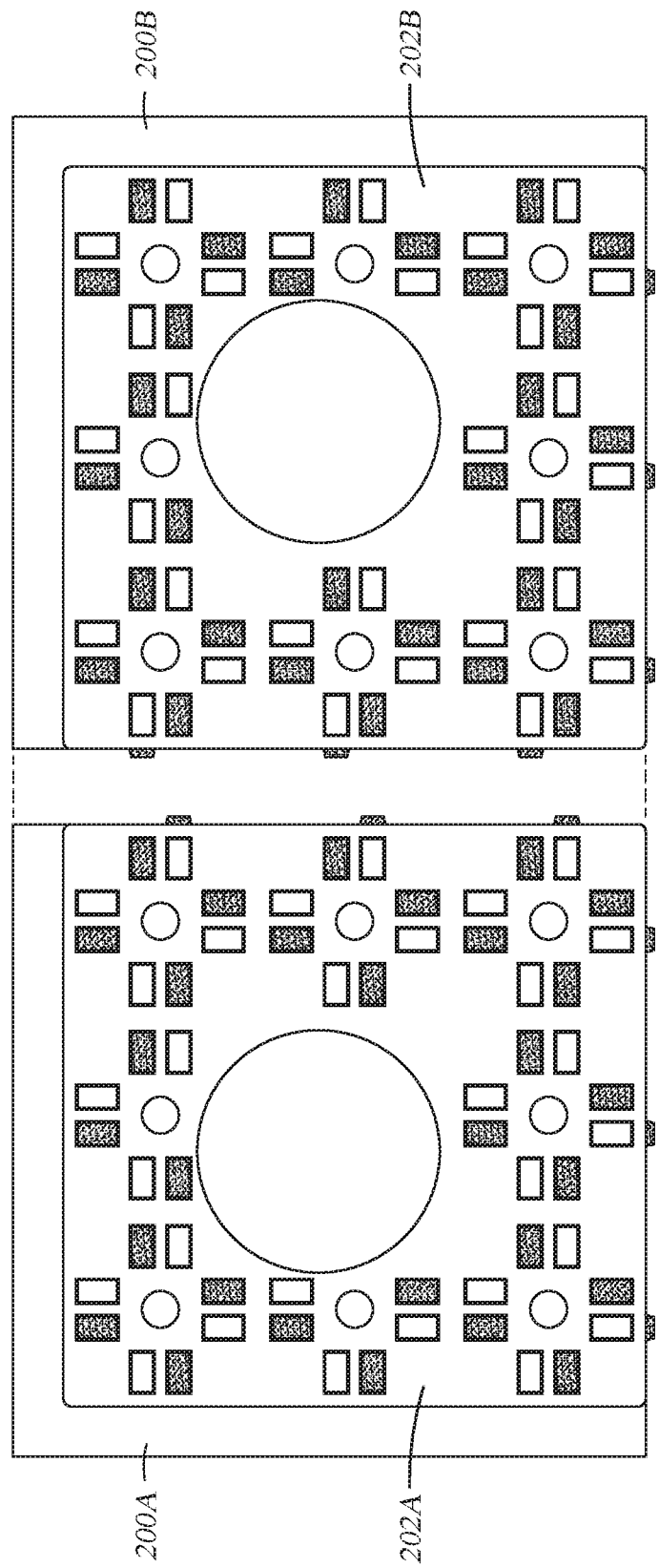

FIGS. 2A-2D2 depict an example of using improved tools for engaging and manipulating containers including corner fittings, such as described with respect to FIGS. 1A-1B.

FIG. 2A depicts two containers, 200A and 200B, each comprising a corner fitting with surface connector arrangements 202A and 202B, in an unconnected and adjacent arrangement. Containers 200A and 200B may be many sizes, including for example, nominally 12-inches, 18-inches, 24-inches, 32, inches, 48-inches, 64-inches, 96 inches, in the length, width, and/or height directions, and even longer in the length direction. However, in FIGS. 2A-2C and following figures, only the portions of the containers 200A and 200B adjacent to the corner fittings 202A and 202B are shown for clarity.

FIGS. 2B1 and 2B2 depict a tool 204 comprising two slideable portions, which are plates 206A and 206B in this embodiment, and a movement mechanism, which in this embodiment includes a pinion (or gear) 208 and a rack (or gear track) 210.

The two slideable plates 206A and 206B are slideably connected to each other such that each one can move relative to the other one in a motion plane while remaining rigidly connected to the other.

Each of the slideable plates 206A and 206B include pins (e.g., 212) that are spaced to align with and engage the engagement recesses (e.g., 214) in the corner fittings. Because plates 206A and 206B are slideable relative to each other, they can be easily aligned with the engagement recesses 214 in corner fittings 202A and 202B.

In this embodiment, the pins 212 have a diameter of approximately 0.375-inch to match with engagement recesses 214, however, in some embodiments the pin diameter, or a portion thereof, may be made slightly smaller for easier engagement. For example, pins 212 may have a slight draft to make it easier for pins 212 to enter engagement recesses 214. Similarly, engagement recesses 214 may have a chamfer for the same purpose.

Notably, a 0.375-inch pin with 95 ksi shear stress can carry 10,492 pounds. Thus, with three pins 212 engaged with three engagement recesses 214, there is an approximately 31,477 pound capacity, which is adequate to pull heavy containers into contact with each other.

Pinion 208 may be configured with a stud or other connection element so that an external tool, such as a socket wrench or an electric or air-powered tool, can be used to turn the pinion along rack 210 to cause one plate 206A to slide relative to another plate 206B. The combination of pinion 208 and rack 210 may referred to as a rack-and-pinion system. Notably, in this embodiment, the rack-and-pinion system comprises a single pinion 208, but in other embodiments, if more mechanical advantage is required, a system of reducing pinions (or gears) can be provided.

As depicted in FIGS. 2C1 and 2C2, the action of pinion 208 and rack 210 has brought the right-hand corner fittings 202A and 202B into contact with each other, which has also caused the surface connector arrangements of each corner fitting to engage with each other, thus providing a solid connection between containers 200A and 200B.

Further, pinion 208 and track 210 may be used to pre-stress joined corner fittings 202A and 202B to make it easier to attach other connection equipment, such as corner fitting clips (or other retainers), which are described in more detail below.

Pinion 208 and track 210 may be used in the opposite direction as well. For example, by reversing the direction of pinion 208, containers 200A and 200B can be separated as well as the surface connector arrangements on their corner fittings.

As depicted in FIGS. 2D1 and 2D2, tool 204 may be removed from containers 200A and 200B after they are brought together, which beneficially reduces the weight of the combined containers. Thus, unlike conventional connection equipment, tool 204 may be used to manipulate containers 200A and 200B into engagement with each other and then be removed before transport. However, it may be beneficial to leave tool 204 attached until all of the corner fittings between two containers have been securely attached to each other.

Figure 3A:
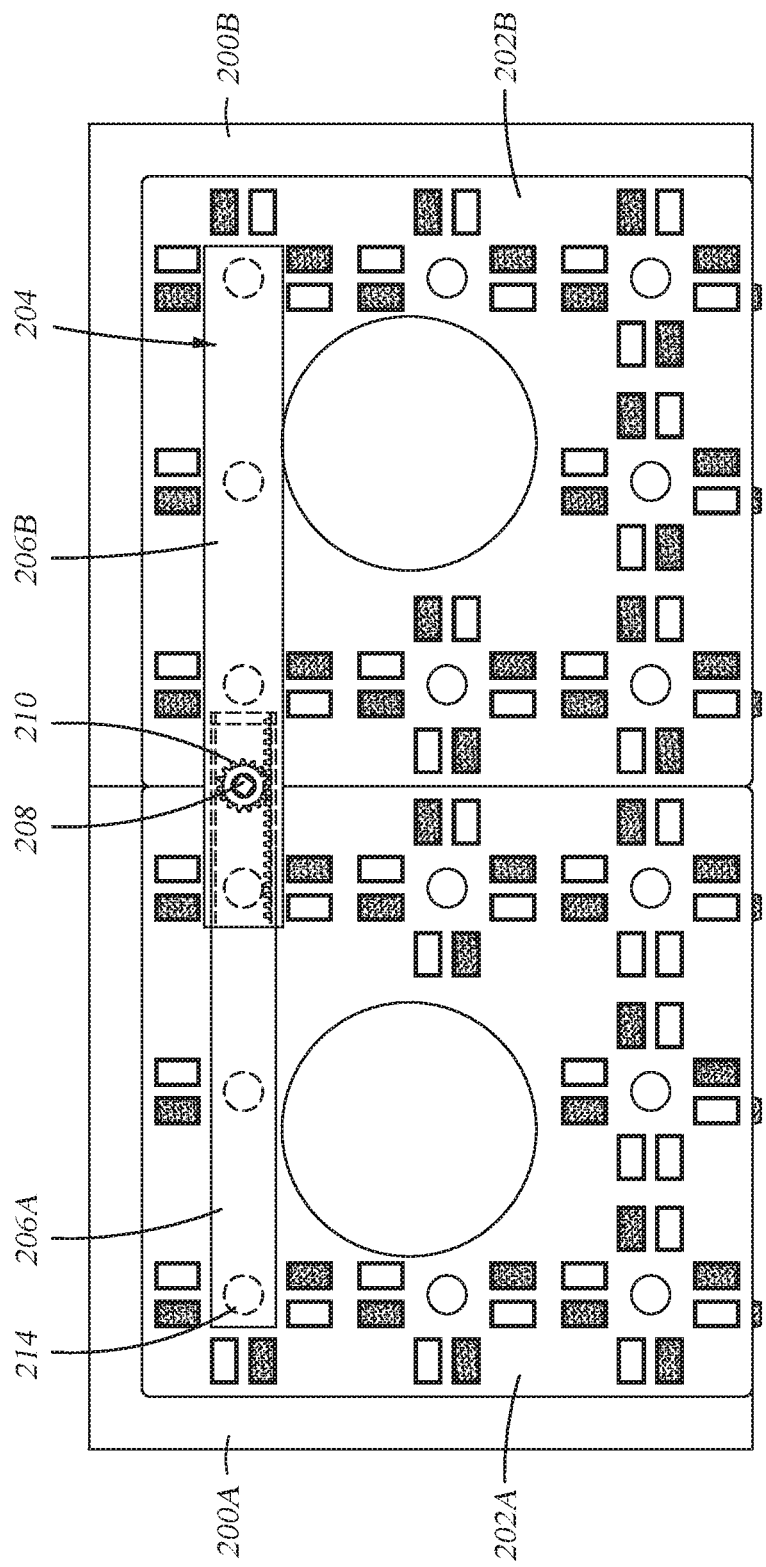
FIGS. 3A-3B depict alternative arrangements of tools for engaging and manipulating containers including corner fittings.
Figure 3B:
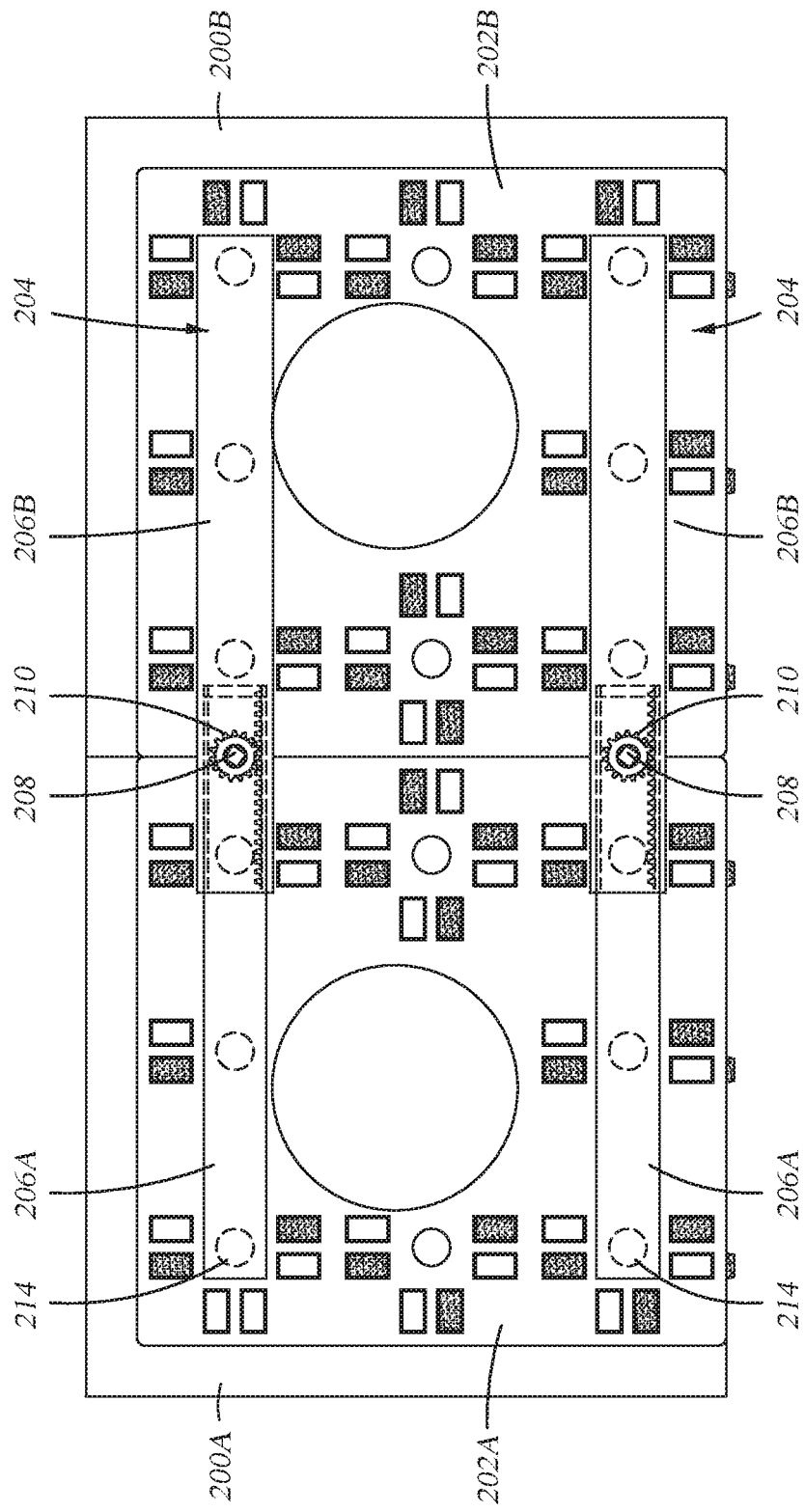

FIGS. 3A-3B depict alternative arrangements of tool 204. For example, in FIG. 3A, tool 204 is used on a different set of engagement recesses as compared to FIGS. 2B-2C. Further, FIG. 3B shows that multiple tools 204 can be used if more force is required.

Though not depicted in these figures, a similar tool with pins configured to engage all eight engagement recesses on each face of corner fittings 202A and 202B could be used if even more force is required, which may be the case if the cargo in the containers is very heavy.

Corner Fitting Clips for Securing Containers

Figure 4:
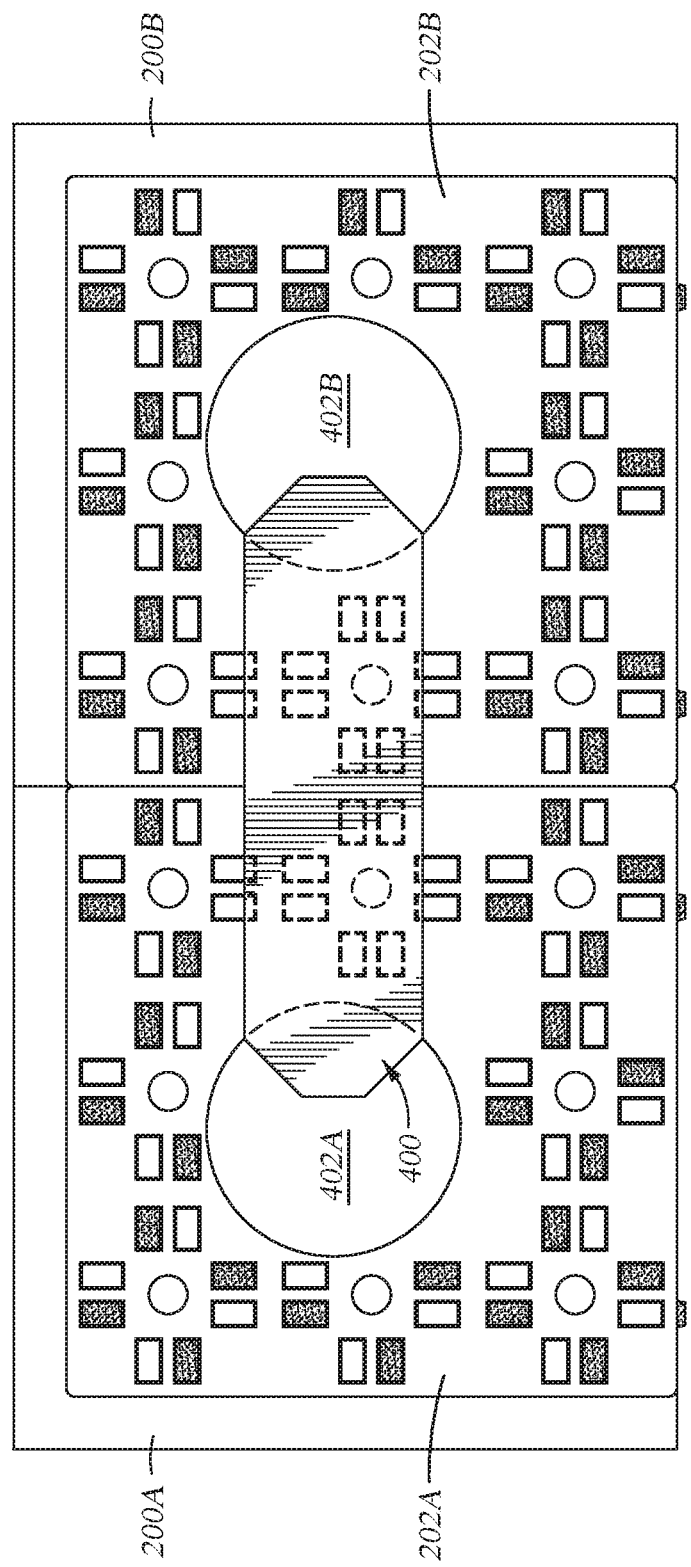
FIG. 4 depicts an example of a clip that secures two container corner fittings to each other.

FIG. 4 depicts an example of a clip 400 that secures two container corner fittings to each other, and thereby, two containers.

In this example, clip 400 is configured to slide into corner fittings 202A and 202B. In some embodiments, clip 400 may be retained by friction or engagement with a lip or other structure within apertures 402A and 402B. However, in other embodiments, as depicted below, additional hardware may be used to secure clip 400 to corner fittings 202A and 202B.

FIGS. 5A1-5C2 depict various embodiments of additional hardware for retaining corner fitting clips. In each figure, a cross-sectional view is aligned with a section cut view.

In FIGS. 5A1 and 5A2, bolts 502 are used to ensure that clip 500 stays connected to corner fittings 202A and 202B. In some embodiments, locking hardware may be used to ensure that bolts 502 do not loosen due to vibration. For example, cotter pins may be used.

FIGS. 5B1 and 5B2 depict a similar arrangement to FIGS. 5A1 and 5A2, but in this example, clip 500 fits into a recess in corner fittings 202A and 202B and similarly bolts 504 are countersunk into clip 500. Thus, in this embodiment, clip 500 and its retaining hardware sit flush with the surfaces of containers 200A and 200B, which may be useful when many containers are stacked together. For example, recessed connection hardware will not obstruct corner fitting faces from fitting tightly against each other when containers are stacked side by side. Further, the recesses may allow for larger connection hardware to be used when needed for additional strength. Further yet, this allows clip 500 and its connection hardware to not protrude out of a 96-inch width envelope used by ISO-standard containers.

FIGS. 5C1 and 5C2 depicts another example where bolts 506 are relocated so that the recess or threaded hole is more interior to the corner fitting compared to that shown in FIG. 5B2. As with the other embodiments, a slight protrusion of the head of each bolt can be easily locked with a cotter pin or other alternative locking method.

Figure 6A:
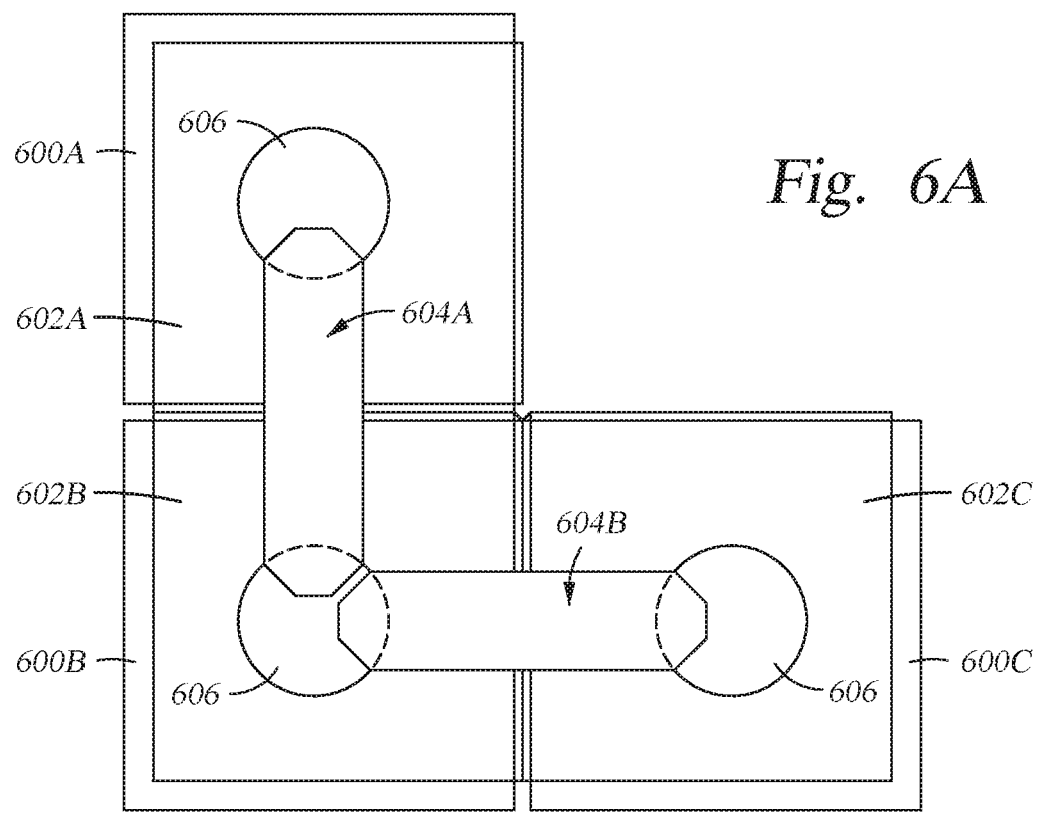

FIGS. 6A-6C4 depict various geometries for the container corner fitting clips, which allow them to interface with many types of corner fitting apertures and in different directions.

For example, FIG. 6A depicts two clips 604A and 604B connected between corner fittings 602A, 602B, and 602C of containers 600A, 600B, and 600C. In this example, clips 604A and 604B have the same design as they are interfacing with the same aperture designs in each corner fitting.

Notably, clips 604A and 604B include angled portions (e.g., 606) so that multiple clips can connect to an aperture (e.g., 608) without interfering with each other.

Figure 6B:
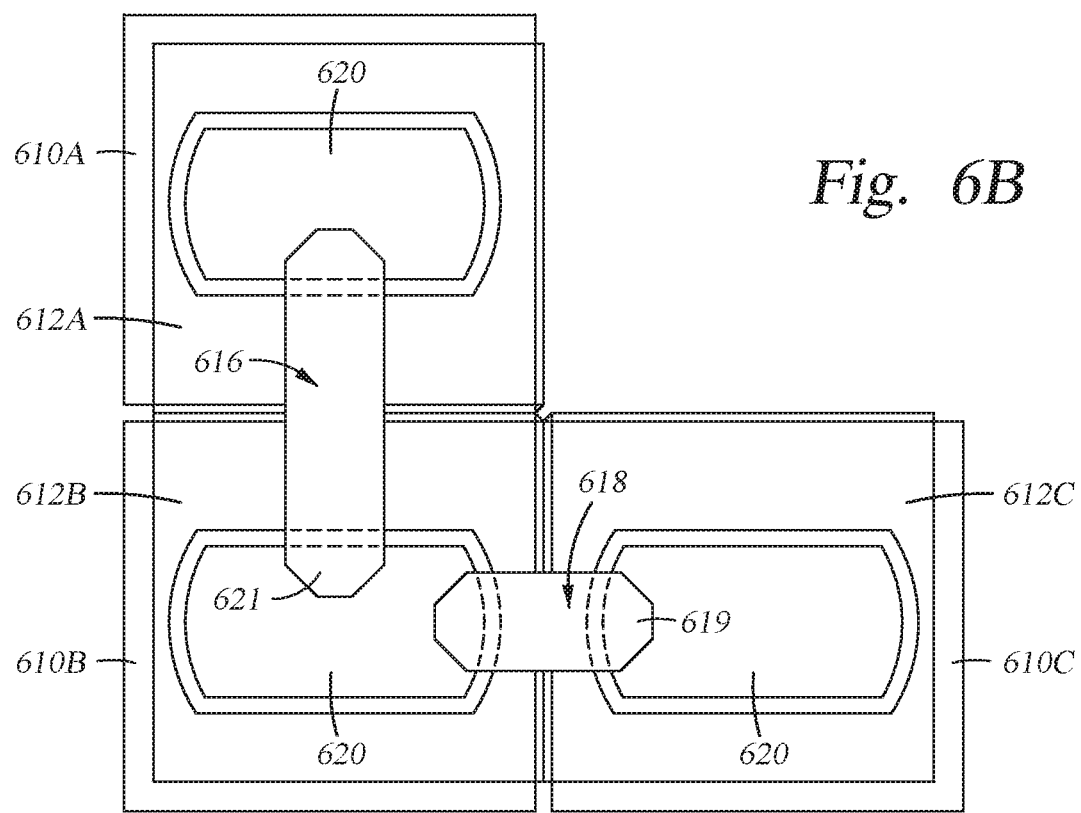

In FIG. 6B, two different types of clips 616 and 618 are depicted as attaching between three of the same type of corner fitting 612A-C. In particular, this example shows how clips 616 and 618 may be used to interface with a bottom face of an ISO-compatible corner fitting, which is also compatible with conventional ISO twist-locks.

As depicted in this example, clips 616 and 618 engage different portions of the apertures 620 in corner fittings 612A-C and thus use different aperture engagement portions 619 and 621. For example, clip 616 interfaces with flat portions of apertures 610 in corner fittings 612A and 612B while clip 618 interfaces with curved portions of apertures 610 in corner fittings 612B and 612C.

FIGS. 6C1-6C4 depict four different corner fittings 620A-620C, which each have a different aperture geometry. In this example, corner fitting 620B includes an aperture 642 like that found on a top face of an ISO top corner fitting, or a bottom face of a bottom corner fitting; corner fitting 620C includes an aperture 644 like that found on a forward or rear face of an ISO top corner fitting; and corner fitting 620D includes an aperture 646 like that found on a side face of an ISO top or bottom corner fitting. Thus, different clips with different aperture engagement portions designed for the various aperture geometries are depicted.

For example, clips 622 are shown attached to corner fitting 620A with an aperture engagement portion 623 based on aperture 640's geometry. Because corner fitting 620A includes an aperture 640 with circular geometry, clips 622 of the same type are able to interface with aperture 640 from multiple directions.

Corner fitting 620B on the other hand, includes an aperture 642 with a different geometry, and thus clips 624 and 626 have different aperture engagement portions 625 and 627 to interface with different portions of aperture 642. Further, the clips have different lengths based on the distance from the aperture engagement surface to the edge of the corner fitting.

Similarly, corner fitting 620C includes an aperture 644 with another different geometry, and thus clips 632 and 628 have different aperture engagement portions 629 and 633 to interface with different portions of aperture 644. And here again, the clips have different lengths based on the distance from the aperture engagement surface to the edge of the corner fitting.

Finally, corner fitting 620D includes an aperture 646 with another different geometry, and thus clips 630 and 628 have different aperture engagement portions 629 and 631 to interface with different portions of aperture 644. And here again, the clips have different lengths based on the distance from the aperture engagement surface to the edge of the corner fitting. However, note here that clips 628 works on aperture 646 as well as 644 despite the different aperture geometries.

Figure 7A:
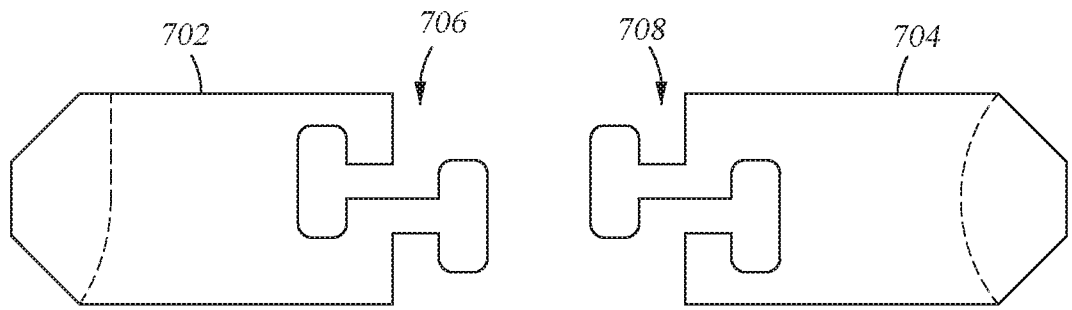
FIGS. 7A-7C depict modular, two-part corner fitting clips.
Figure 7B:
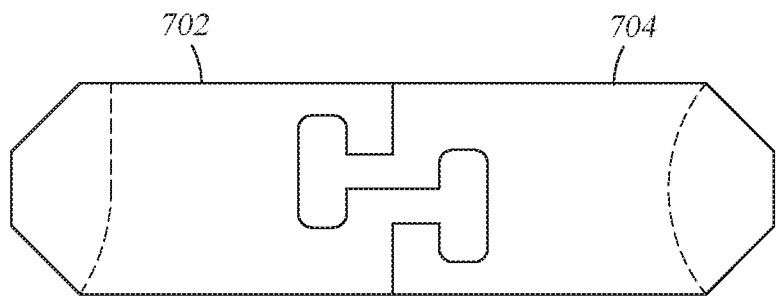
Figure 7C:
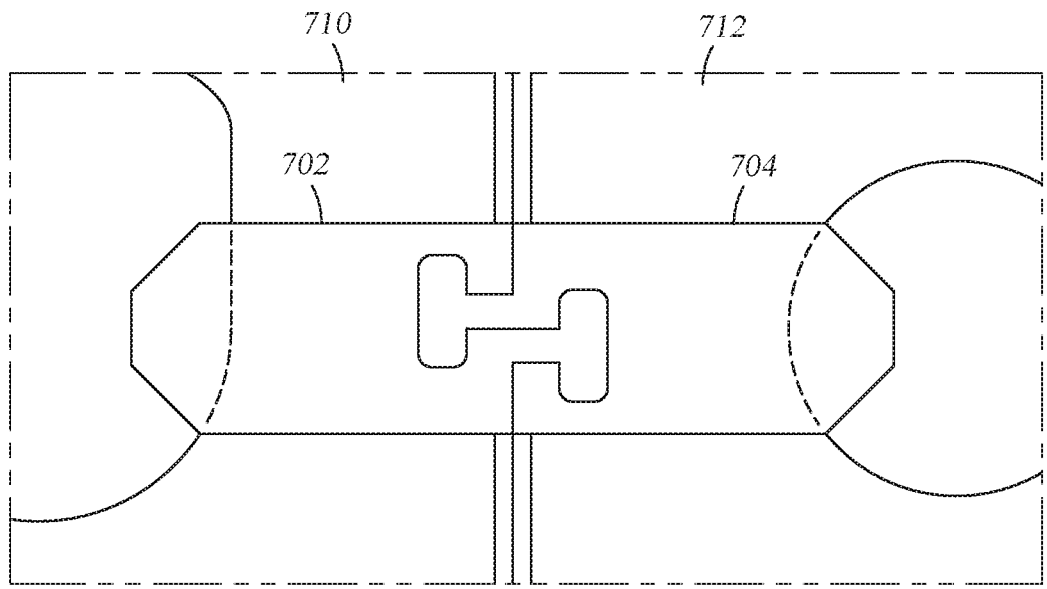

In order to make the corner fitting clips more versatile in view of the many different corner fitting geometries available, FIGS. 7A-7C depict modular, two-part corner fitting clips, which allow for mixing and matching shapes.

For example, FIG. 7A depicts two modular corner fitting clip parts 702 and 704, which include modular connectors 706 and 708, respectively. Notably, modular connectors 706 and 708 use connector patterns with male-female features that have 180° rotational symmetry (e.g., with respect to a horizontal line cutting through the center of corner fitting clip parts 702 and 704), which allows the modular connector to easily interlock. In other words, if modular connector 706 is flipped 180 degrees, it then matches modular connector 708. Thus, for example, two of the same pieces (e.g., two corner fitting clip parts 702) can be connected together to form a clip with the same geometry on each side of the clip, or clip parts with different geometries can be joined in different orientations, as depicted in FIG. 7B.

FIG. 7C depicts an example of modular corner fitting clip parts 702 and 704 connecting two corner fittings 710 and 712 having different aperture geometries.

Notably, while FIGS. 7A-7C depict an example with two specific modular corner fitting clip parts 702 and 704, any clip design can serve as one of the modular clip parts. Further, markings may be added to the corner fittings and/or the clip parts to indicate which clip shapes will fit which corner fitting aperture geometries.

FIGS. 8A1-8B4 depict examples of clip and corner fitting features for further retaining clips.

For example, in FIGS. 8A1-8A4, corner fittings 800A-D include clip retainer recesses 802A-F. The recesses may interface with one or more clip placement pins (804A-F) on a clip, such as shown in FIGS. 8B1-8B4. Though not depicted in FIGS. 8A1-8A4, in some embodiments, the engagement recesses (e.g., 108 in FIG. 1) may be used as clip retainer recesses 802A-F.

As depicted in FIGS. 8A1-8B4, the position of the clip placement pins may be specific to the type of clip used (or the type of modular clip part used). Beneficially, the combination of clip retainer recesses (e.g., 802A-F) and clip placement pins (804A-F) precludes the installation of the wrong clip geometry on a particular corner fitting.

Notably, while these examples shows clip placement pins being the same size and shape, in other embodiments the clip placement pins may be different sizes and shapes, which could further assist with discriminating the particular clips that work particular corner fitting designs.

FIGS. 9A-9E depict an example self-locking corner fitting clip with an integral retention mechanism.

Figure 9A:
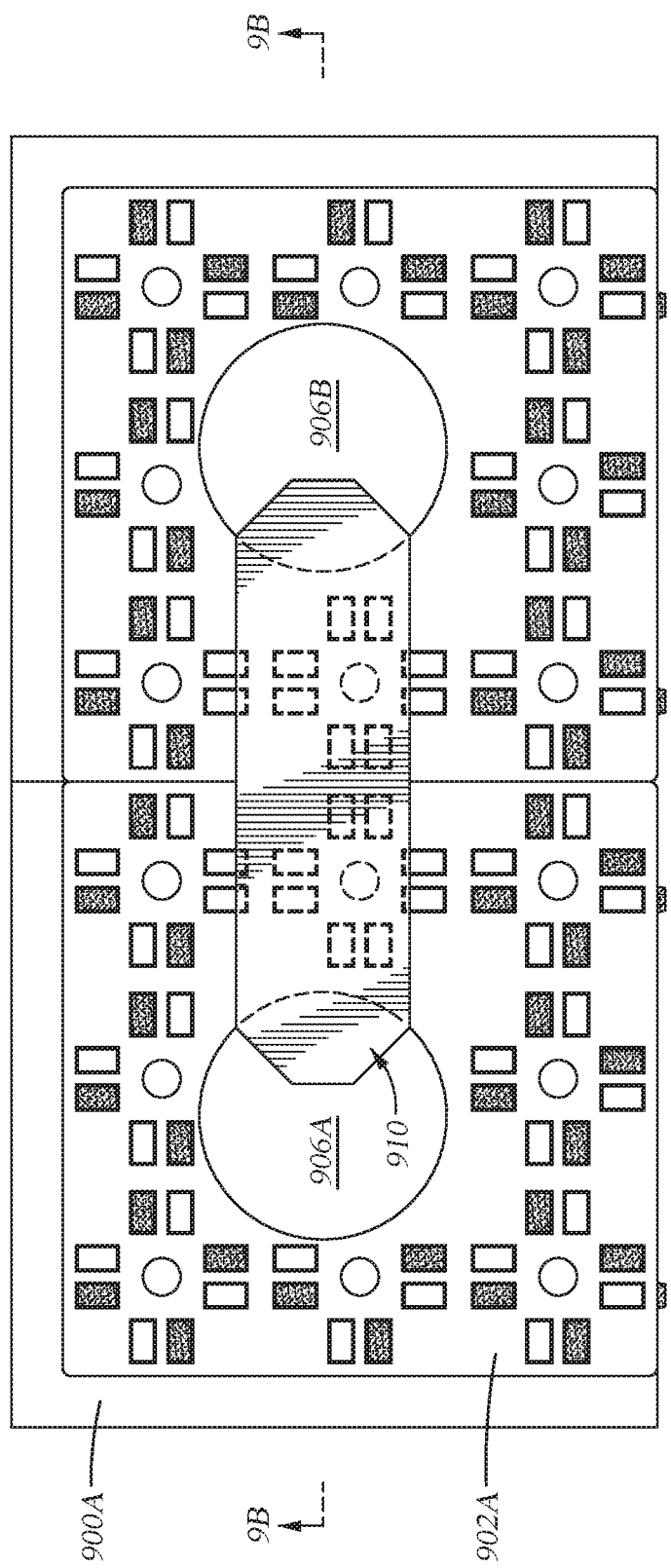
FIGS. 9A-9E depict an example container clip with an integral retention mechanism.

In particular, FIG. 9A depicts a split view of a clip 910 configured to interface with corner fittings 902A and 902B of containers 900A and 900B.

Figure 9B:
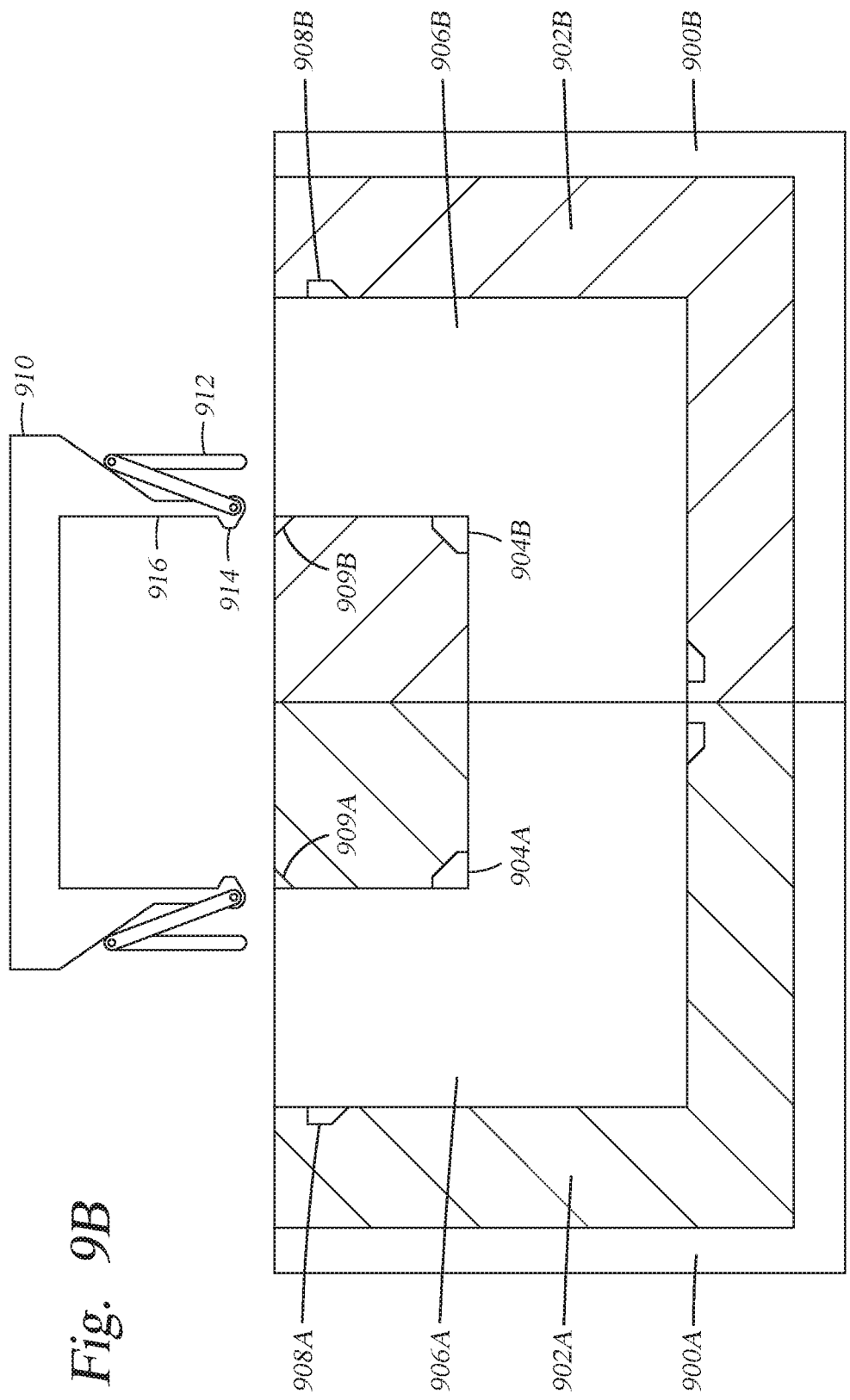

As depicted in FIG. 9B, Clip 910 includes an integral retention mechanism comprising a hinged, extendable brace 912 and a flexible arm 916 with an engagement tab 914 at its end.

Corner fittings 902A and 902B include apertures that form internal volumes 906A and 906B, respectively. Within the internal volumes are shelves 904A and 904B, which are configured to interface with the engagement tabs 914 on clip 910. In some embodiments, the tab is approximately 0.25 inches wide.

Further, corner fittings 902A and 902B include chamfers 909A and 909B to guide the flexible arms and tabs into the internal volumes 906A and 906B. In some embodiments, this chamfer need not be around the whole circumference of the aperture leading to the internal volume, but only where the tab is expected to interface with the corner fitting.

Figure 9C:
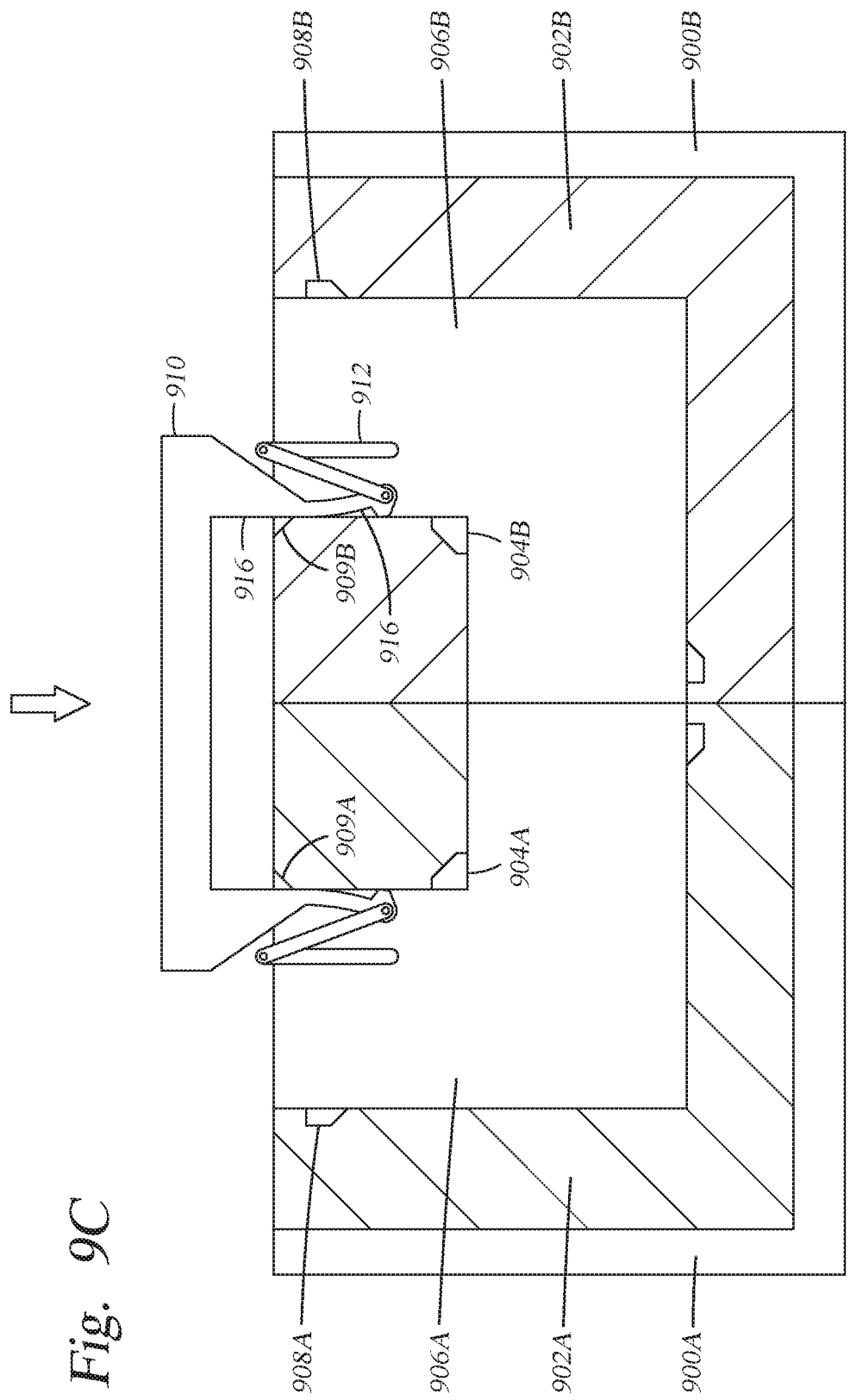

FIG. 9C depicts clip 910 in the process of being inserted (in the direction of the arrow) into internal volumes 906A and 906B. While being inserted, the flexible arms 916 will elastically bend to allow the tabs to move outward from the main body of clip 910.

Figure 9D:
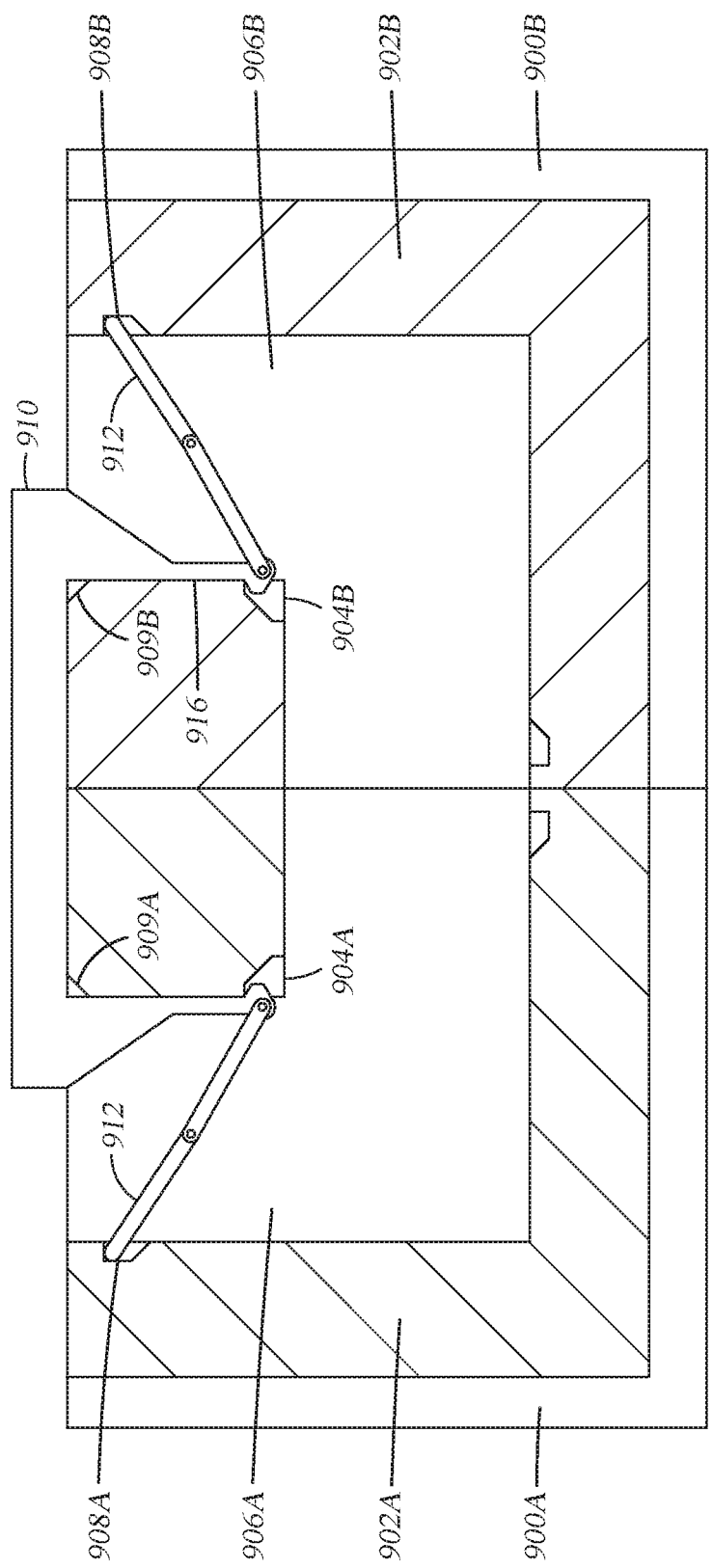

FIG. 9D depicts clip 910 full engaged with corner fittings 902A and 902B. Notably, the tabs 914 have moved into shelves 904A and 904B of the corner fittings, which serve to retain clip 910 in its position and prevent it from movement outward from the corner fittings.

Further, the braces 912 are now filly extended and locked into further shelves 908A and 908B within the inner volumes 906A and 906B of corner fittings 902A and 902B. To lock braces 912 into place, the center joint of the braces are pushed over-the-center so that they are bent slightly inward i.e., in the same direction of the clip insertion. In this embodiment, the joint is designed so that further rotation past this position is prevented. Thus, braces 912 are configured to function as a column that will prevent the tabs 914 from moving away from the shelf.

Figure 9E:
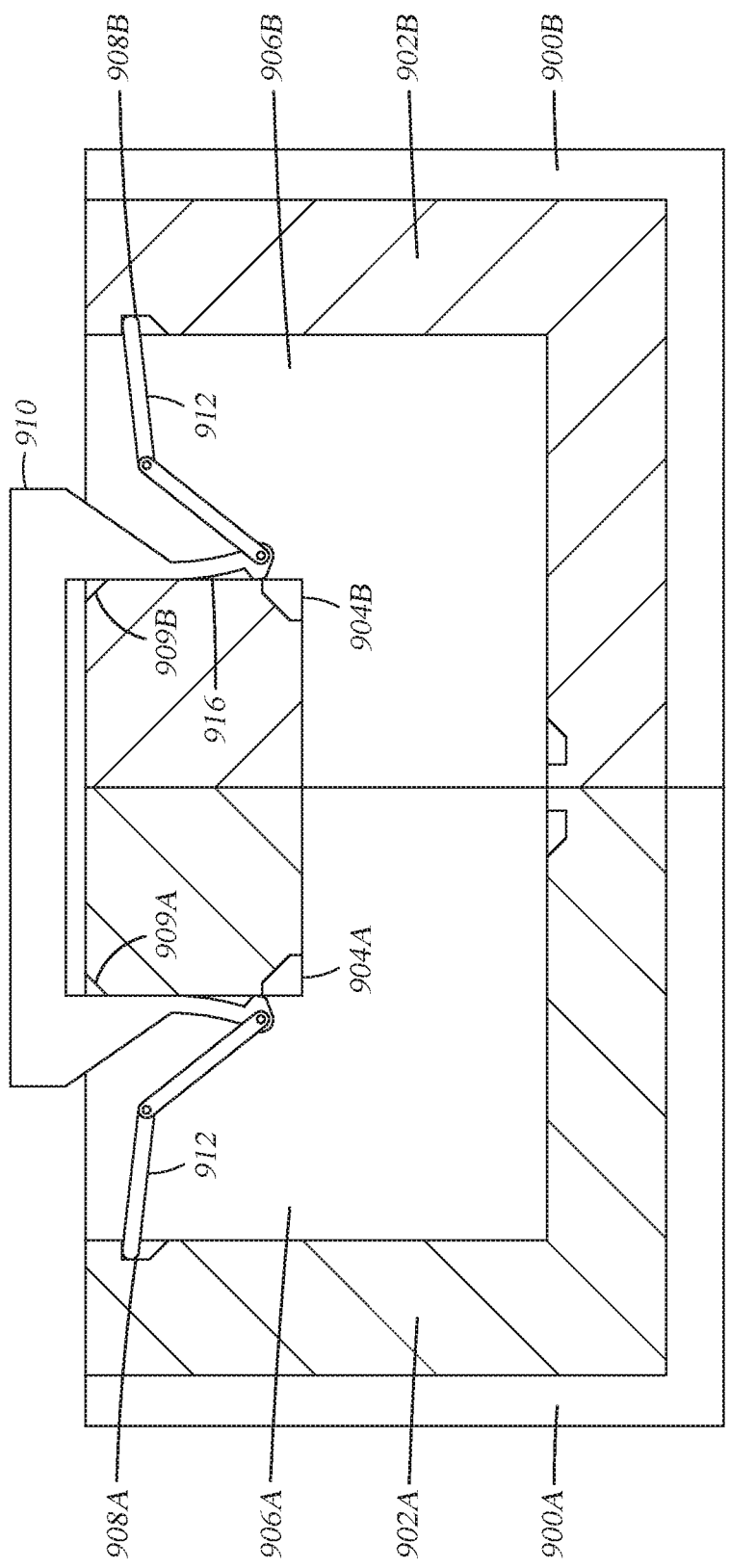

In order to disengage clip 910 from corner fittings 902A and 902B, the center joint of braces 912 are pulled outward as depicted in FIG. 9E. In this position, braces 912 no longer resist tab 914 from moving away from the shelves 904A and 904B. Further, force is put onto the outer leg of each brace 912 to rotate it outward about the center of rotation at shelves 908A and 908B. This action pulls tab 914 away from the shelves.

With tab 914 pulled away from shelves 904A and 904B, clip 910 may be pulled outward away from the fittings. Once tab 914 has cleared the shelves 904A and 904B, it can be allowed to spring back to push against the side of the hole.

Notably, FIGS. 9A-9E depict one possible design of a self-locking corner fitting clip, but other, self-locking mechanisms are possible, such as spring-loaded self-locking clips and other biased clip designs.

Example Method for Connecting Containers

Figure 10:
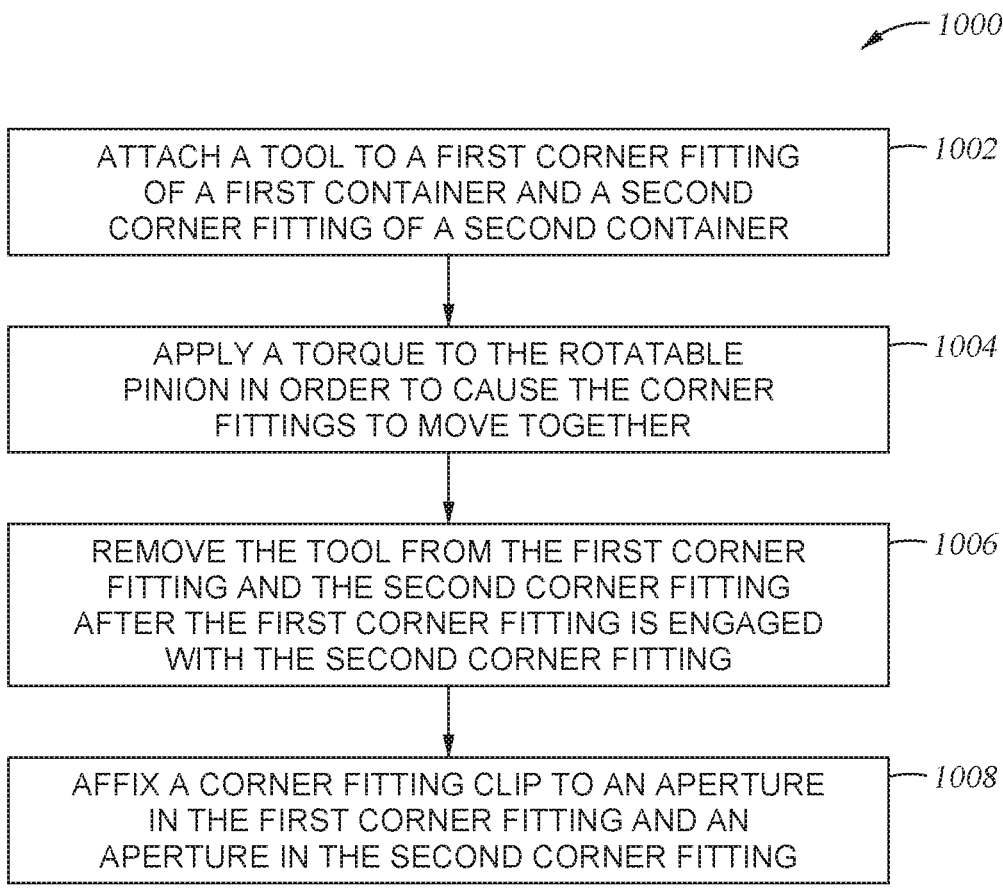
FIG. 10 depicts an example method for connecting containers.

FIG. 10 depicts an example method 1000 for connecting containers.

Method 1000 begins at step 1002 with attaching a tool to a first corner fitting of a first container and a second corner fitting of a second container. In some embodiments, the tool comprises: a first slideable portion comprising a first plurality of pins and a rack; and a second slideable portion slideably connected to the first slideable portion and comprising a second plurality of pins and a rotatable pinion in contact with the rack, such as depicted above in FIGS. 2B1, 2B2, 2C1, 2C2, 3A, and 3B. In some embodiments, attaching the tool comprises: inserting the first plurality of pins on the first slidable portion into a first plurality of engagement recesses in the first corner fitting; and inserting the second plurality of pins on the second slideable portion into a second plurality of engagement recesses in the second corner fitting, such as depicted above in FIGS. 2B1, 2B2, 2C1, 2C2, 3A, and 3B.

Method 1000 then proceeds to step 1004 with applying a torque to the rotatable pinion in order to cause: the first slideable portion to apply a first force to the first corner fitting in a first direction and move the first container in the first direction; and the second slideable portion to apply a second force to the second container in a second direction, opposite the first direction, and move the second container in the second direction. In some examples, the torque may be applied via a manual tool, such as a wrench or a ratcheting wrench that provides a mechanical advantage through a lever arm. In other examples, the torque may be applied by a machine tool, such as a powered driver that provides a mechanical advantage through gearing. Notably, they are just some examples, and many other mechanisms for applying torque are possible.

Method 1000 then proceeds to step 1006 with removing the tool from the first corner fitting and the second corner fitting after the first corner fitting is moved into engagement with the second corner fitting.

Method 1000 then proceeds to step 1008 with affixing a corner fitting clip to an aperture in the first corner fitting and an aperture in the second corner fitting.

In some embodiments, steps 1002-1006 can be reversed to move the first container and second container apart.

In some embodiments of method 1000, the corner fitting clip comprises a first corner fitting clip part connected to a second corner fitting clip part, such as depicted above in FIGS. 7A-7C.

In some embodiments of method 1000, the first corner fitting clip part comprises an aperture engagement portion of a first design, and the second corner fitting clip part comprises an aperture engagement portion of a second design, such as depicted above in FIGS. 7A-7C.

In some embodiments of method 1000, the first corner fitting and the second corner fitting each comprises a plurality of surface connector arrangements, each surface connector arrangement of the plurality of surface connector arrangements comprises at least two connector elements, at least one connector element of the at least two connector elements is of a first type, and at least one connector element of the at least two connector elements is of a second type, such as depicted above in FIGS. 1A-1B, 2A-2D2, and 3A-3B.

In some embodiments of method 1000, applying the torque to the rotatable pinion further causes: one or more surface connectors of the first type on the first corner fitting to engage with one or more surface connectors of the second type on the second corner fitting, such as depicted above in FIGS. 2C1, 2C2, 2D1, and 2D2.

In some embodiments of method 1000, each surface connector arrangement of the plurality of surface connector arrangements comprises an engagement recess in a center of the surface connector arrangement, such as depicted above in FIGS. 2B1, 2B2, 2C1, 2C2, 3A, and 3B.

In some embodiments of method 1000, a center of each surface connector arrangement of the plurality of surface connector arrangements is located 1.993 inches from a center of another surface connector arrangement of the plurality of surface connector arrangements, such as depicted above in FIGS. 1A-1B.

In some embodiments of method 1000, the first corner fitting comprises a first aperture centered approximately 3.379 inches from a first edge of the first corner fitting and approximately 3.379 inches from a second edge of the first corner fitting, and the second corner fitting comprises a second aperture centered approximately 3.379 inches from a first edge of the second corner fitting and approximately 3.379 inches from a second edge of the second corner fitting, such as depicted above in FIGS. 1A-1B.

In some embodiments of method 1000, the first corner fitting comprises a first exterior dimension of 5.983 inches and a second exterior dimension of 5.983 inches, and the second corner fitting comprises a first exterior dimension of 5.983 inches and a second exterior dimension of 5.983 inches, such as depicted above in FIGS. 1A-1B.

Figure 11:
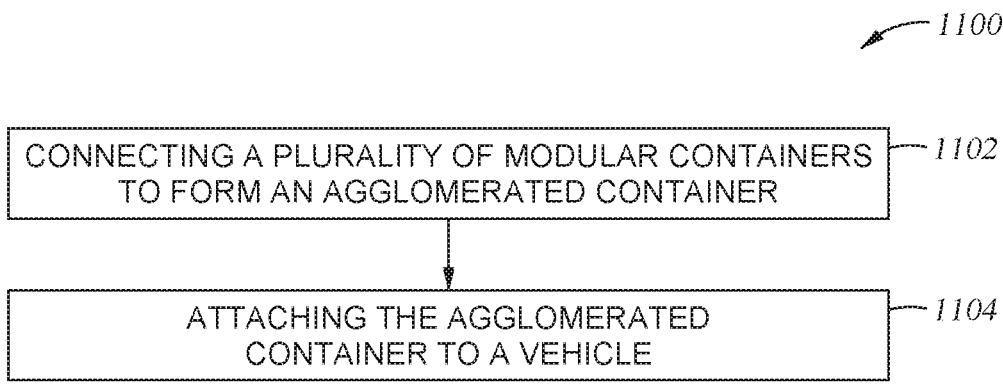
FIG. 11 depicts an example method 1100 of securing containers.

FIG. 11 depicts an example method 1100 of securing containers.

Method 1100 begins at step 1102 with determining a first aperture geometry of an aperture of a first corner fitting. For example, different aperture geometries are depicted and described above with respect to FIGS. 6A-6C4.

Method 1100 then proceeds to step 1104 with determining a second aperture geometry of an aperture of a second corner fitting.

Method 1100 then proceeds to step 1106 with selecting a corner fitting clip based on the first aperture geometry and the second aperture geometry.

In some embodiments of method 1100, selecting a corner fitting clip based on the first aperture geometry and the second aperture geometry comprises: selecting a first corner fitting clip part based on the first aperture geometry; and selecting a second corner fitting clip part based on the second aperture geometry.

In some embodiments of method 1100, the first corner fitting clip part comprises a first modular connector and the second corner fitting clip part comprises a second modular connector, such as depicted in FIGS. 7A-7C. Further, in some embodiments the first modular connector is 180 degree symmetric with the second modular connector, such as depicted in FIGS. 7A-7C.

In some embodiments of method 100, the first corner fitting clip part comprises a first aperture engagement portion, and the second corner fitting clip part comprises a second aperture engagement portion. In some embodiments, the first aperture engagement portion is different from the second aperture engagement portion.

In some embodiments, method 1100 further comprises attaching the first corner fitting clip part to the second corner fitting clip part to form the corner fitting clip.

Method 1100 then proceeds to step 1108 with affixing the corner fitting clip to the aperture of the first corner fitting and the aperture of the second corner fitting.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, "approximately" with respect to a dimension means plus or minus standard manufacturing tolerances.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions.

What is claimed is:

1. A method of securing containers, comprising:
attaching a tool to a first corner fitting of a first container and a second corner fitting of a second container, wherein:
the tool comprises:
a first slideable portion comprising a first plurality of pins and a rack; and
a second slideable portion slideably connected to the first slideable portion and comprising a second plurality of pins and a rotatable pinion in contact with the rack, and
attaching the tool comprises:
inserting the first plurality of pins on the first slidable portion into a first plurality of engagement recesses in the first corner fitting; and
inserting the second plurality of pins on the second slideable portion into a second plurality of engagement recesses in the second corner fitting;
applying a torque to the rotatable pinion in order to cause:
the first slideable portion to apply a first force to the first corner fitting in a first direction and move the first container in the first direction; and
the second slideable portion to apply a second force to the second container in a second direction, opposite the first direction, and move the second container in the second direction; and
removing the tool from the first corner fitting and the second corner fitting after the first corner fitting is moved into engagement with the second corner fitting.

2. The method of claim 1, wherein:
the first corner fitting and the second corner fitting each comprises a plurality of surface connector arrangements,
each surface connector arrangement of the plurality of surface connector arrangements comprises at least two connector elements,
at least one connector element of the at least two connector elements is of a first type, and
at least one connector element of the at least two connector elements is of a second type.

3. The method of claim 2, wherein applying the torque to the rotatable pinion further causes: one or more surface connectors of the first type on the first corner fitting to engage with one or more surface connectors of the second type on the second corner fitting.

4. The method of claim 2, wherein each surface connector arrangement of the plurality of surface connector arrangements comprises an engagement recess in a center of the surface connector arrangement.

5. The method of claim 2, wherein a center of each surface connector arrangement of the plurality of surface connector arrangements is located 1.993 inches from a center of another surface connector arrangement of the plurality of surface connector arrangements.

6. The method of claim 5, wherein:
the first corner fitting comprises a first exterior dimension of 5.983 inches and a second exterior dimension of 5.983 inches, and
the second corner fitting comprises a first exterior dimension of 5.983 inches and a second exterior dimension of 5.983 inches.

7. The method of claim 1, wherein:
the first corner fitting comprises a first aperture centered approximately 3.379 inches from a first edge of the first corner fitting and approximately 3.379 inches from a second edge of the first corner fitting, and
the second corner fitting comprises a second aperture centered approximately 3.379 inches from a first edge of the second corner fitting and approximately 3.379 inches from a second edge of the second corner fitting.

8. The method of claim 1, further comprising: affixing a corner fitting clip to an aperture in the first corner fitting and an aperture in the second corner fitting.

9. The method of claim 8, wherein: the corner fitting clip comprises a first corner fitting clip part connected to a second corner fitting clip part.

10. The method of claim 9, wherein:
the first corner fitting clip part comprises an aperture engagement portion of a first design, and
the second corner fitting clip part comprises an aperture engagement portion of a second design.

11. A method of securing containers, comprising:
attaching a tool to a first corner fitting of a first container and a second corner fitting of a second container, wherein:
the tool comprises:
a first slideable portion comprising a first plurality of pins and a rack; and
a second slideable portion slideably connected to the first slideable portion and comprising a second plurality of pins and a rotatable pinion in contact with the rack, and
attaching the tool comprises:
inserting the first plurality of pins on the first slidable portion into a first plurality of engagement recesses in the first corner fitting; and
inserting the second plurality of pins on the second slideable portion into a second plurality of engagement recesses in the second corner fitting;
applying a torque to the rotatable pinion in order to cause:
the first slideable portion to apply a first force to the first corner fitting in a first direction and move the first container in the first direction; and
the second slideable portion to apply a second force to the second container in a second direction, opposite the first direction, and move the second container in the second direction.

12. The method of claim 11, wherein:
the first corner fitting and the second corner fitting each comprises a plurality of surface connector arrangements,
each surface connector arrangement of the plurality of surface connector arrangements comprises at least two connector elements,
at least one connector element of the at least two connector elements is of a first type, and
at least one connector element of the at least two connector elements is of a second type.

13. The method of claim 12, wherein applying the torque to the rotatable pinion further causes: one or more surface connectors of the first type on the first corner fitting to engage with one or more surface connectors of the second type on the second corner fitting.

14. The method of claim 12, wherein each surface connector arrangement of the plurality of surface connector arrangements comprises an engagement recess in a center of the surface connector arrangement.

15. The method of claim 12, wherein a center of each surface connector arrangement of the plurality of surface connector arrangements is located 1.993 inches from a center of another surface connector arrangement of the plurality of surface connector arrangements.

16. The method of claim 15, wherein:
the first corner fitting comprises a first exterior dimension of 5.983 inches and a second exterior dimension of 5.983 inches, and
the second corner fitting comprises a first exterior dimension of 5.983 inches and a second exterior dimension of 5.983 inches.

17. The method of claim 11, wherein:
the first corner fitting comprises a first aperture centered approximately 3.379 inches from a first edge of the first corner fitting and approximately 3.379 inches from a second edge of the first corner fitting, and
the second corner fitting comprises a second aperture centered approximately 3.379 inches from a first edge of the second corner fitting and approximately 3.379 inches from a second edge of the second corner fitting.

18. The method of claim 11, further comprising: affixing a corner fitting clip to an aperture in the first corner fitting and an aperture in the second corner fitting.

19. The method of claim 18, wherein: the corner fitting clip comprises a first corner fitting clip part connected to a second corner fitting clip part.

20. The method of claim 19, wherein:
the first corner fitting clip part comprises an aperture engagement portion of a first design, and
the second corner fitting clip part comprises an aperture engagement portion of a second design.

* * * * *